United States Patent
Lim

(10) Patent No.: US 11,243,735 B2
(45) Date of Patent: Feb. 8, 2022

(54) ELECTRONIC PANEL HAVING MULTIPLE DISPLAY DEVICES AND A MULTI-STATE DEVICE OPERABLE WITH A PROCESSOR TO CONTROL A SEE-THROUGH MODE AND A PLURALITY OF DISPLAY MODES

(71) Applicant: Lim Industries LLC, Oswego, NY (US)

(72) Inventor: Kevin J. Lim, Oswego, NY (US)

(73) Assignee: Lim Industries LLC, Liverpool, NY (US)

( * ) Notice: Subject to any disclaimer, the term of this patent is extended or adjusted under 35 U.S.C. 154(b) by 4 days.

(21) Appl. No.: 16/375,224

(22) Filed: Apr. 4, 2019

(65) Prior Publication Data

US 2019/0235822 A1    Aug. 1, 2019

Related U.S. Application Data

(63) Continuation-in-part of application No. 15/019,596, filed on Feb. 9, 2016, now Pat. No. 10,254,577.

(51) Int. Cl.

| | |
|---|---|
| *G06F 3/14* | (2006.01) |
| *G06F 1/16* | (2006.01) |
| *G06F 9/30* | (2018.01) |
| *G02F 1/1334* | (2006.01) |
| *G09G 3/34* | (2006.01) |

(Continued)

(52) U.S. Cl.
CPC .......... *G06F 3/1446* (2013.01); *G02F 1/1334* (2013.01); *G06F 1/1647* (2013.01); *G06F 9/3004* (2013.01); *G09G 3/3406* (2013.01); *G09G 3/36* (2013.01); *G09G 5/36* (2013.01); *G06F 3/1423* (2013.01); *G09G 2300/023* (2013.01); *G09G 2300/0478* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 5,903,329 | A | 5/1999 | Yoshida et al. |
| 5,926,239 | A | 7/1999 | Kumar et al. |

(Continued)

FOREIGN PATENT DOCUMENTS

| | | |
|---|---|---|
| DE | 102008060122 A1 | 10/2010 |
| DE | 102015120191 A1 | 5/2017 |

(Continued)

OTHER PUBLICATIONS

Prodisplay, "LCD Glass and LCD Film", <http://prodisplay.com/wp-content/uploads/lcd-glass-film-brochure.pdf>, on or before Aug. 7, 2015, 5 pages.

(Continued)

*Primary Examiner* — Lauren Nguyen
(74) *Attorney, Agent, or Firm* — Barclay Damon LLP

(57) ABSTRACT

An electronic panel has, in an embodiment, a multi-state device positioned between a plurality of display devices. The panel also has at least one light source and at least one processor operatively coupled to the display devices, the multi-state device, and the at least one light source. The at least one processor is configured or programmed to control a plurality of modes, including a see-through mode and a plurality of display modes operable to generate images directed toward different environments.

22 Claims, 18 Drawing Sheets

(51) Int. Cl.
*G09G 5/36* (2006.01)
*G09G 3/36* (2006.01)

(52) U.S. Cl.
CPC ... *G09G 2360/04* (2013.01); *G09G 2360/144* (2013.01); *G09G 2380/16* (2013.01)

(56) References Cited

U.S. PATENT DOCUMENTS

| | | |
|---|---|---|
| 6,819,309 B1 | 11/2004 | Kishi |
| 6,986,581 B2 | 1/2006 | Sun et al. |
| 7,514,859 B2 | 4/2009 | Naberhuis et al. |
| 8,125,145 B2 | 2/2012 | Fiebranz |
| 8,638,411 B2 | 1/2014 | Park et al. |
| 9,007,277 B2 | 4/2015 | Fleck |
| 9,997,583 B2 | 6/2018 | Zhang et al. |
| 2003/0122771 A1 | 7/2003 | Sumiyoshi et al. |
| 2005/0007517 A1 | 1/2005 | Anandan |
| 2006/0109397 A1 | 5/2006 | Anandan |
| 2007/0057881 A1 | 3/2007 | Yu et al. |
| 2008/0158480 A1 | 7/2008 | Ji et al. |
| 2009/0067156 A1 | 3/2009 | Bonnett et al. |
| 2010/0026933 A1* | 2/2010 | Daigle ............. G02F 1/1334 349/65 |
| 2012/0019434 A1* | 1/2012 | Kuhlman ............. G09G 3/36 345/1.3 |
| 2012/0105306 A1* | 5/2012 | Fleck ............. G06F 1/1643 345/1.1 |
| 2012/0162269 A1 | 6/2012 | Bohn et al. |
| 2014/0078089 A1 | 3/2014 | Lee et al. |
| 2014/0293179 A1 | 10/2014 | Kashima |
| 2017/0227818 A1 | 8/2017 | Lim |
| 2018/0211630 A1 | 7/2018 | Kato |

FOREIGN PATENT DOCUMENTS

| | | |
|---|---|---|
| EP | 2128845 A1 | 12/2009 |
| EP | 2047324 B1 | 2/2012 |
| EP | 2711826 A1 | 3/2014 |
| KR | 2014006252 | 1/2014 |
| WO | 9108508 A1 | 6/1991 |

OTHER PUBLICATIONS

Samsung, "Samsung Transparent OLED", on or before Jun. 29, 2015, 1 page.

Mit, "Method and Apparatus for Transparent Display Using Up-Converting Nanoparticles", <https://web.archive.org/web/20151019130210/http://technology.mit.edu/technologies/16097_methods-and-apparatus-for-transparent-display-using-up-converting-nanoparticles>, Oct. 19, 2015, 3 pages.

NXP founded by Philips, "Introduction to Graphics and PCD Technologies", <https://web.archive.org/web/20150405065558/http://www.nxp.com/wcm_documents/techzones/microcontrollers-techzone/Presentations/graphics.lcd.technologies.pdf>, Apr. 5, 2015, 34 pages.

Ces, "Samsung's Smart Window", <https://www.youtube.com/watch?v=m5rlTrdF5Cs>, Jan. 12, 2012, 3 pages.

Aaron Tilley, "Smart Window Maker View Raises $150 Million", <http://www.forbes.com/sites/aarontilley/2015/08/13/smart-glass-maker-view-raises-150-million/>, Aug. 13, 2015, 2 pages.

Toppan, "Color Filters for LCDs", <http://www.toppan.co.jp/electronics/english/display/lcd/>, on or before Feb. 8, 2016, 3 pages.

Hideo Fujikake, "Advanced Flexible Liquid-Crystal Display Technologies", <http://spie.org/x31616.xml>, SPIE 2008, on or before Dec. 31, 2008, 3 pages.

PCT/US2020/025671; filed Mar. 30, 2020; International Search Report and Written Opinion; dated Jun. 19, 2020 (13 pages).

* cited by examiner

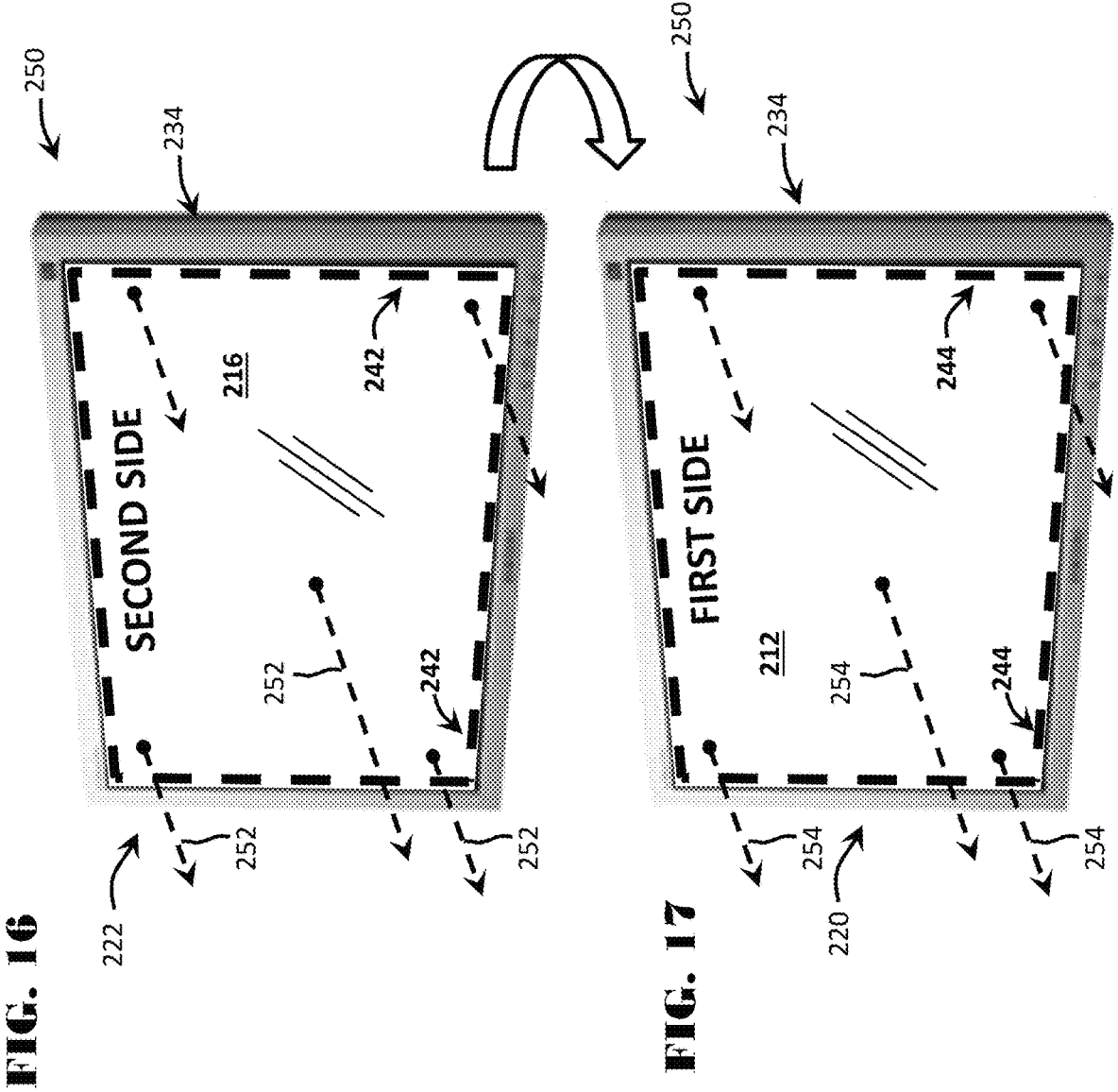

ELECTRONIC PANEL HAVING MULTIPLE DISPLAY DEVICES AND A MULTI-STATE DEVICE OPERABLE WITH A PROCESSOR TO CONTROL A SEE-THROUGH MODE AND A PLURALITY OF DISPLAY MODES

CROSS-REFERENCE TO RELATED APPLICATION

This application is a continuation-in-part of, and claims the benefit and priority of, U.S. patent application Ser. No. 15/019,596 filed on Feb. 9, 2016. The entire contents of such application are hereby incorporated by reference.

BACKGROUND

Display monitors enable people to view images generated by electronic devices. Individuals and businesses rely heavily on electronic images for business operations, information, socialization and entertainment. This mainstream reliance and demand for images continues to grow at a rapid pace.

In response, there has been a mass adoption of electronic devices of various types, including outdoor flat monitors, wall-mounted televisions, computers and mobile devices, such as smartphones and tablets. It is common for a home to have several wall-mounted, flat screen televisions, several computers and a smartphone for each household member. It is also common for facilities, such as manufacturing plants, central command centers and hospitals, to have arrays of wall-mounted monitors for use by employees. Furthermore, it is common for downtown city areas to have numerous, outdoor flat monitors mounted to the outsides of commercial buildings. These outdoor monitors display advertisements and entertaining graphics.

There is substantial, financial cost caused by the complexity of having to procure, install, use, manage and support so many different types of electronic devices. The complexity of having to use many different types of devices can also cause emotional stress to the end users.

An attempt has been made to consolidate display functions on a common, known medium, window glass. There is a known type of window liquid crystal display (LCD) glass that incorporates an LCD unit. The user can control the LCD glass to switch between an opaque mode and a transparent mode. However, the LCD glass is not operable to suitably generate images which are viewable. This is because the LCD glass does not incorporate a backlight device necessary to properly illuminate the LCD unit. Adding a backlight device and backlight diffuser would destroy the transparency of the LCD glass. Consequently, the user must use an additional, external device to provide illumination for an image to complement the LCD glass. Therefore, it is relatively expensive and costly to use the LCD glass as a monitor. Furthermore, having to mount, adjust and maintain the external devices can cause reliability problems, labor burdens and costs.

For a monitor, itself, to serve as a building window, it must be transparent. There are known monitors which are partially transparent. One such monitor has a transparent organic light emitting diode (OLED) module. The OLED module can provide transparency in one mode and generate a visible image in another mode. Another known monitor has a clear layer of plastic embedded with nanoparticles. This monitor has a laser generator which can direct a laser beam at each separate nanoparticle. This causes the nanoparticles to emit light for generating a visible image.

However, these known monitors require control of the discrete image-generating elements, the OLED pixels and the nanoparticles. This level of discrete control consumes a relatively high amount of processing power and requires relatively complex electronics, such as the OLED technology and the laser beam generator. This demand for power and complexity can make it relatively expensive and burdensome to procure, install and maintain these type of monitors. Also, the relative high complexity makes these monitors prone to breakdowns and subject to reliability problems. For these reasons, attempting to use these types of monitors as building windows would be a relatively high risk effort with burdensome costs and technical disadvantages.

The foregoing background describes some, but not necessarily all, of the problems, disadvantages and shortcomings related to the known LCD glass and monitors having transparency.

SUMMARY

The electronic panel, in an embodiment, includes: (a) a front layer having a front surface positionable to face toward a first environment; and (b) an LCD located behind the front layer. The LCD is associated with an image display area. The electronic panel also includes: (a) a luminescent layer located behind the LCD; and (b) a light filter layer located behind the luminescent layer. The light filter layer is configured to prevent ultraviolet light from passing from a second environment through the light filter layer. Also, the electronic panel includes: (a) at least one radiator operable to radiate ultraviolet light; (b) a frame which supports the front layer, the LCD, the luminescent layer, the light filter layer and the at least one radiator so that no portion of the at least one radiator overlaps with the image display area; and (c) at least one processor operatively coupled to the LCD and the at least one radiator. The at least one processor is configured to control: (a) a see-through mode based on a first event to enable visible light to pass between the first and second environments; and (b) a background mode based on a second event so that the at least one radiator causes the luminescent layer to emit visible white light to illuminate the LCD, facilitating a display of one or more images toward the first environment.

In an embodiment, the electronic panel includes: (a) a front layer having a front surface positionable to face toward a first environment; and (b) an LCD located behind the front layer. The LCD is associated with an image display area. In addition, the electronic panel includes a lighting device located behind the LCD. The lighting device is see-through behind the image display area when the electronic panel is in a see-through mode. Also, the electronic panel includes: (a) a back layer having a back surface positionable to face toward a second environment; (b) a frame which supports the front layer, the back layer, the LCD and the lighting device; and (c) at least one processor operatively coupled to the LCD and the lighting device. The at least one processor is configured to control: (a) the see-through mode based on a first event to enable visible light to pass between the first and second environments while the lighting device is powered-off; and (b) a display mode based on a second event so that the lighting device generates visible white light to illuminate the LCD, facilitating a display of one or more images toward the first environment.

In an embodiment, the electronic panel includes: (a) a front layer having a front surface positionable to face toward a first environment; and (b) an LCD located behind the front layer. The LCD is associated with an image display area. Also, the electronic panel includes a luminescent layer located behind the LCD. The luminescent layer is transparent when not exposed to ultraviolet light. In addition, the electronic panel includes a light filter layer located behind the luminescent layer. The light filter layer has a back surface configured to face toward a second environment, and the light filter layer is configured to: (a) enable visible light from the second environment to pass through the light filter layer; and (b) prevent ultraviolet light from passing from the second environment through the light filter layer. The electronic panel also includes: (a) at least one radiator operable to radiate ultraviolet light; and (b) a frame which supports the front layer, the LCD, the at least one radiator and the light filter layer. The frame defines an opening sized at least as great as the image display area, and the frame supports the luminescent layer so that the luminescent layer entirely overlaps the image display area. The electronic panel includes at least one processor operatively coupled to the LCD and the at least one radiator. The at least one processor is operable to control a plurality of viewing modes including a blocking mode, a see-through mode and a background mode.

In the blocking mode, the at least one processor is operable to control the LCD to block the visible light from passing through the LCD, thereby preventing the blocked visible light from reaching the first environment. In the see-through mode, the at least one processor is operable to control the LCD to enable the visible light to pass from the second environment through the LCD, to the first environment. In the background mode, the at least one processor is operable to power the at least one radiator, causing the luminescent layer to absorb the ultraviolet light and emit visible light based on the absorbed ultraviolet light, wherein the emitted visible light includes a white light operable to illuminate the LCD.

Furthermore, the at least one processor is responsive to a plurality of inputs or commands, including: (a) a blocking command triggering the blocking mode; (b) a first display command causing the LCD to generate a first image during the see-through mode, in which event the first image is displayed so as to overlap any physical object in the second environment located behind the light filter layer; and (c) a second display command causing the LCD to generate a background image and a second image during the background mode. The white light illuminates the background image and the second image, and the second image is displayed against the background image.

In another embodiment, the electronic panel includes first and second display devices. The first display device has a first side configured to: (a) face toward a first environment; and (b) generate a first image that is viewable from the first environment. The second display device has a second side configured to: (a) face toward a second environment; and (b) generate a second image that is viewable from the second environment. The electronic panel also has a multi-state device positioned between the first and second display devices. The multi-state device is configured to be switched or changed between a reflection state and a transmission state. The multi-state device has an opaque characteristic in the reflection state, and the multi-state device has a transmission characteristic in the transmission state. The electronic panel also includes at least one light source configured to generate a visible light, and the electronic panel has one or more processors. The one or more processors are operatively coupled to the first display device, the second display device, the multi-state device, and the at least one light source. The one or more processors are programmed to control the first and second display devices, control the multi-state device, and activate a plurality of modes.

Depending on the embodiment, the modes can include a see-through mode, a first display mode, a second display mode, and a privacy mode. The one or more processors are programmed to activate the see-through mode when the multi-state device is in the transmission state. In the see-through mode, the first and second display devices and the multi-state device are configured to enable: (a) first environmental light from the first environment to pass through the first display device, through the multi-state device, through the second display device, and to the second environment; and (b) second environmental light from the second environment to pass through the second display device, through the multi-state device, through the first display device, and to the first environment. The one or more processors are also programmed to activate the first display mode when the multi-state device is in the reflection state. In the first display mode, the first display device is configured to display the first image, and the multi-state device at least partially reflects the visible light to facilitate visibility of the first image. Also, the one or more processors are programmed to activate the second display mode when the multi-state device is in the reflection state. In the second display mode, the second display device is configured to display the second image, and the multi-state device at least partially reflects the visible light to facilitate the visibility of the second image. Furthermore, the one or more processors are programmed to activate the privacy mode in response to an input from a user, an input from a sensor, or at a designated time of day in accordance with computer-readable instructions executed by the one or more processors.

In another embodiment, the electronic panel includes: (a) a first display device; (b) a second display device; (c) a multi-state device positioned between the first and second display devices; (d) at least one light source configured to generate light; and (e) at least one processor operatively coupled to the first display device, the second display device, the multi-state device, and the at least one light source. The at least one processor is configured to control a plurality of modes, including a see-through mode, a first display mode, and a second display mode. In the see-through mode, environmental light is passable from a first environment, through the first display device, through the multi-state device, through the second display device, and to a second environment. In the first display mode, the multi-state device at least partially reflects the light toward the first environment. In the second display mode, the multi-state device at least partially reflects the light toward the second environment.

Another embodiment includes a method for manufacturing an electronic panel. The method includes the following steps: positioning a multi-state device between first and second display devices; accessing at least one light source configured to generate light; operatively coupling at least one processor to the first display device, the second display device, the multi-state device, and the at least one light source; and providing a plurality of instructions that, when executed by the at least one processor, cause the at least one processor to control or activate a plurality of modes, including a see-through mode, a first display mode, and a second display mode. In the see-through mode, environmental light is passable from a first environment, through the first display device, through the multi-state device, through the second display device, and to a second environment. In the first display mode, the multi-state device at least partially reflects the light toward the first environment. In the second display mode, the multi-state device at least partially reflects the light toward the second environment. It should be understood that the foregoing steps of such method do not necessarily have to be conducted in the order described above. Instead, such steps can be conducted in any suitable order.

Additional features and advantages of the present disclosure are described in, and will be apparent from, the following Brief Description of the Drawings and Detailed Description.

BRIEF DESCRIPTION OF THE DRAWINGS

FIG. 16 is a front isometric view of an embodiment of the electronic panel of FIG. 12, illustrating the display region of the electronic panel being see-through and also illustrating the passage of first environmental light from the first side through the second side while the electronic panel is in a see-through mode.

FIG. 17 is a front isometric view of an embodiment of the electronic panel of FIG. 12, illustrating the display region of the electronic panel being see-through and also illustrating the passage of second environmental light from the second side through the first side while the electronic panel is in a see-through mode.

DETAILED DESCRIPTION

Figure 1:
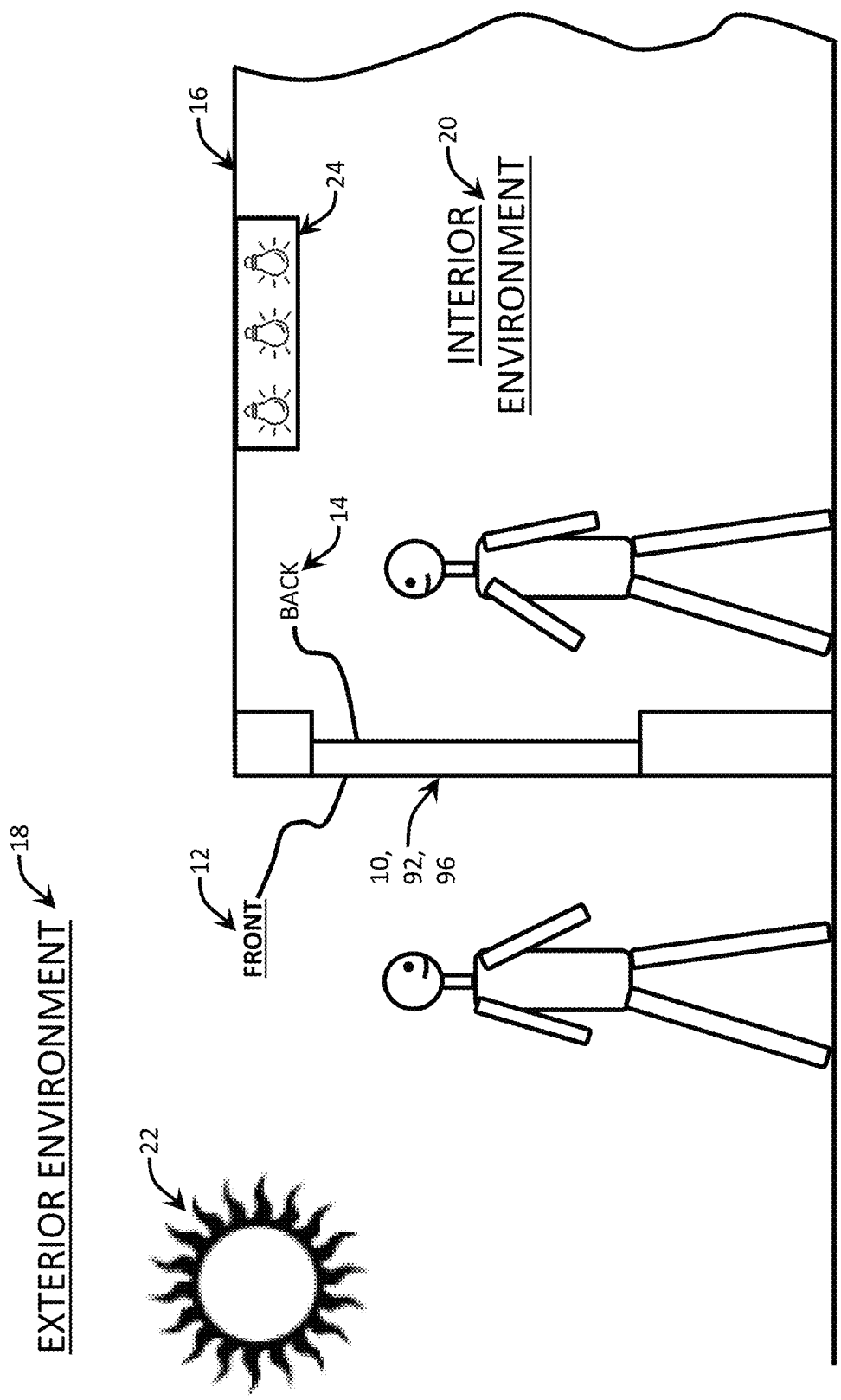
FIG. 1 is a side schematic view of an embodiment of the electronic panel installed in a building such that the panel front faces, and is exposed to, the exterior environment.
Figure 2:
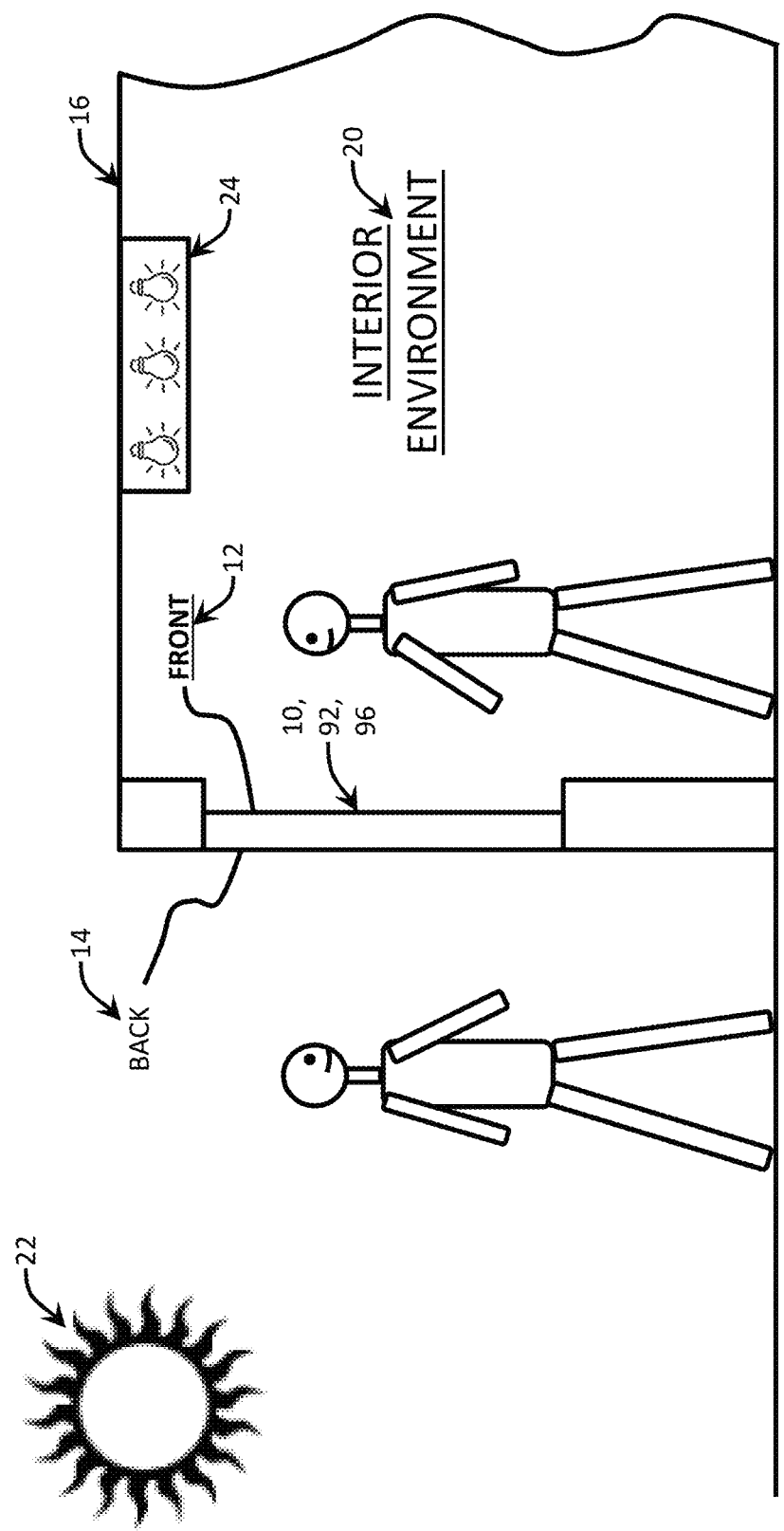
FIG. 2 is a side schematic view of an embodiment of the electronic panel installed in a building such that the panel front faces, and is exposed to, the interior environment of such building.

Referring to FIGS. 1-2, in an embodiment, the window device, display device or electronic panel 10 includes a panel front 12 and a panel back 14. An installer can mount the electronic panel 10 in a building 16 such that the panel front 12 faces, and is exposed to, the exterior environment 18 as illustrated in FIG. 1. Alternatively, the installer can mount the electronic panel 10 so that the panel front 12 faces, and is exposed to, the interior environment 20, as illustrated in FIG. 2. In the example shown, the exterior environment 18 includes visible light and non-visible light (e.g., ultraviolet light) radiated by the sun 22 and by artificial light sources in the exterior environment 18, such as outdoor lamps and vehicle lights. In this example, the interior environment 20 includes one or more light fixtures generating visible light, such as light fixture 24.

In one example, the building 16 with electronic panel 10 may be a street-level store front or a residential home. In operation, the electronic panel 10 illustrated in FIG. 1 serves as an electronic window. As described below, the electronic panel 10 is operable in a transparency or see-through mode to enable viewing through the electronic panel 10 as a window. The electronic panel 10 is also operable in other viewing modes for light blocking and image display purposes, including television functionality, as described below.

Figure 3:
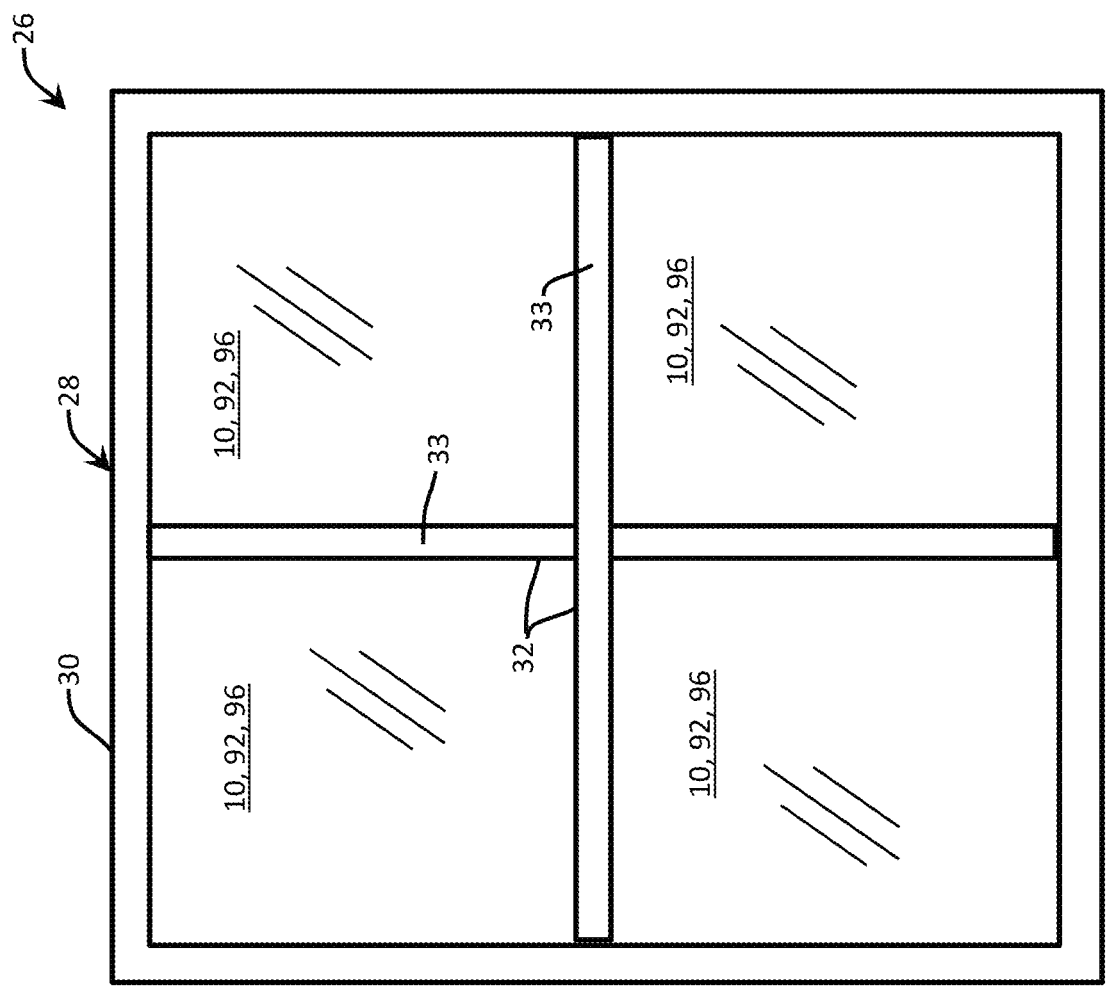
FIG. 3 is a side elevation view of an embodiment of an assembly of electronic panels.
Figure 7:
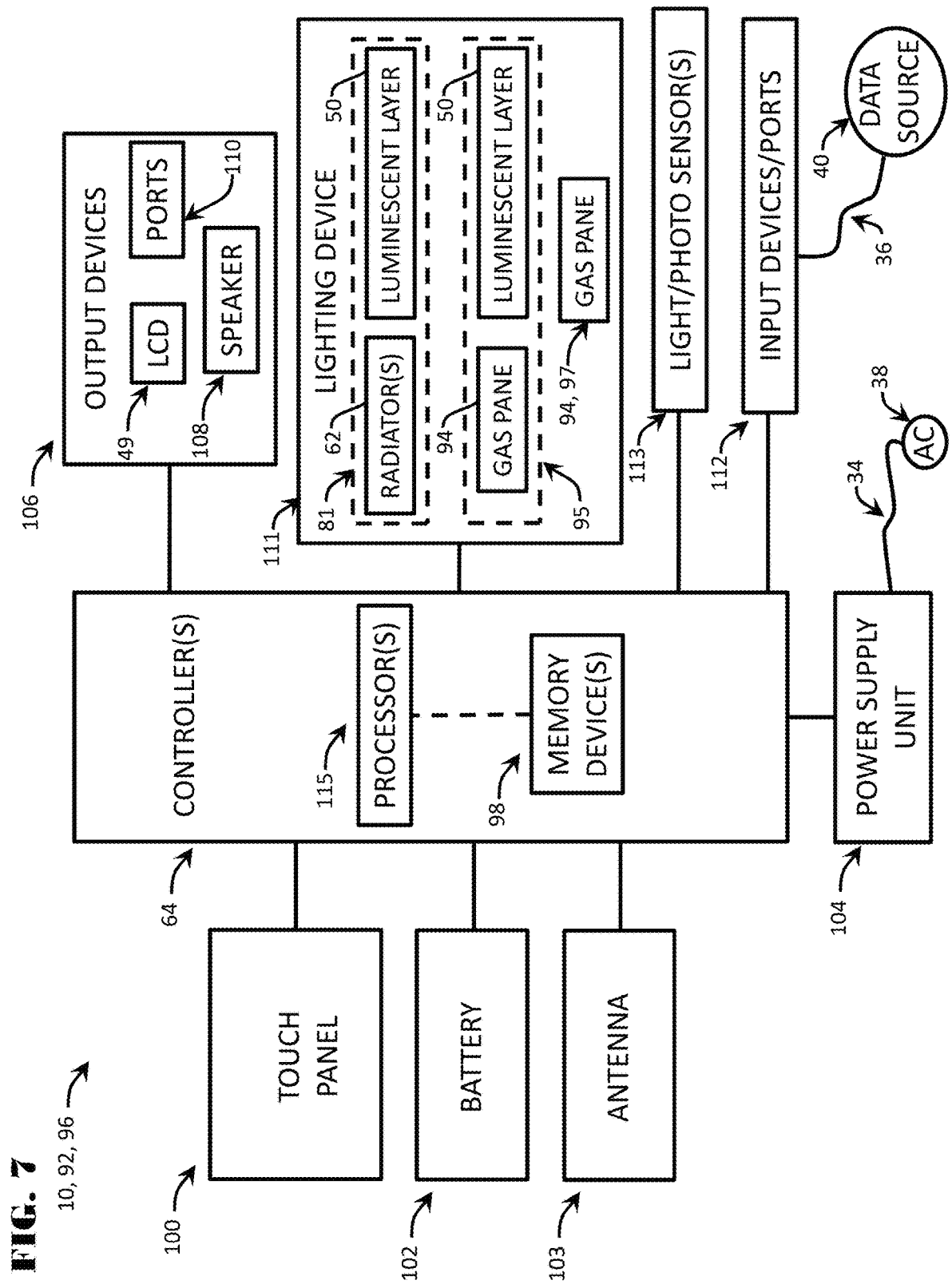
FIG. 7 is a schematic diagram illustrating an embodiment of the electronic configuration of the electronic panel.

As illustrated in FIG. 3, in an embodiment, the electronic panel assembly 26 includes: (a) a main frame 28 having a border structure 30 and a plurality of elongated dividers 32 defining a plurality of openings; and (b) a plurality of electronic panels 10 inserted into such openings and coupled to the dividers 32. Each divider 32 defines a passageway or channel 33. Each electronic panel 10 has an electrical power cable 34 (FIG. 7) and at least one data cable 36 (FIG. 7). In an embodiment, the cables 34 and 36 are configured to be inserted into the channels 33 defined by the dividers 32. The power cables 34 are then electrically connected to an alternating current (AC) power source 38 (FIG. 7) of the building 16. The data cables 36 are electrically connected to a data source 40 (FIG. 7). Depending upon the embodiment, the data source 40 can be a processor, computer, mobile computing device (e.g., a smartphone or tablet) or server located within the building 16.

In another example, the building 16 with electronic panel assembly 26 can be a high rise or skyscraper building with thousands of electronic panels 10 secured within numerous electronic panel assemblies 26. In operation, each electronic panel assembly 26 serves as an electronic window assembly configured for installation into the building 16. Based on the signals from the data source 40, the electronic panels 10 can synchronously operate, or each electronic panel 10 can operate independent of the other electronic panels 10.

For example, all of the electronic panels 10 on the side of a skyscraper building 16 can, as a whole, display a single, relatively large color image or video spanning across the electronic panels 10. In an embodiment, each electronic panel 10 can display a different image or different color. Operable as large pixels of a digital screen, the colors of the electronic panels 10 can be separately controlled to generate a single, color image spanning across the electronic panels 10. The large color image can be of any type, including, but not limited to, a relatively large photograph, icon, company logo, product advertisement or government emergency alert symbol.

In another example, each one of the electronic panels 10 of the electronic panel assembly 26 is installed or located in a separate office of a relatively large commercial building 16. In any particular office, based on input signals from the office occupant, the electronic panel 10 can operate in a transparency or see-through mode to enable viewing through the panel 10 as a window. The electronic panel 10 is also operable in other viewing modes for light blocking and image display purposes as described below.

Figure 4:
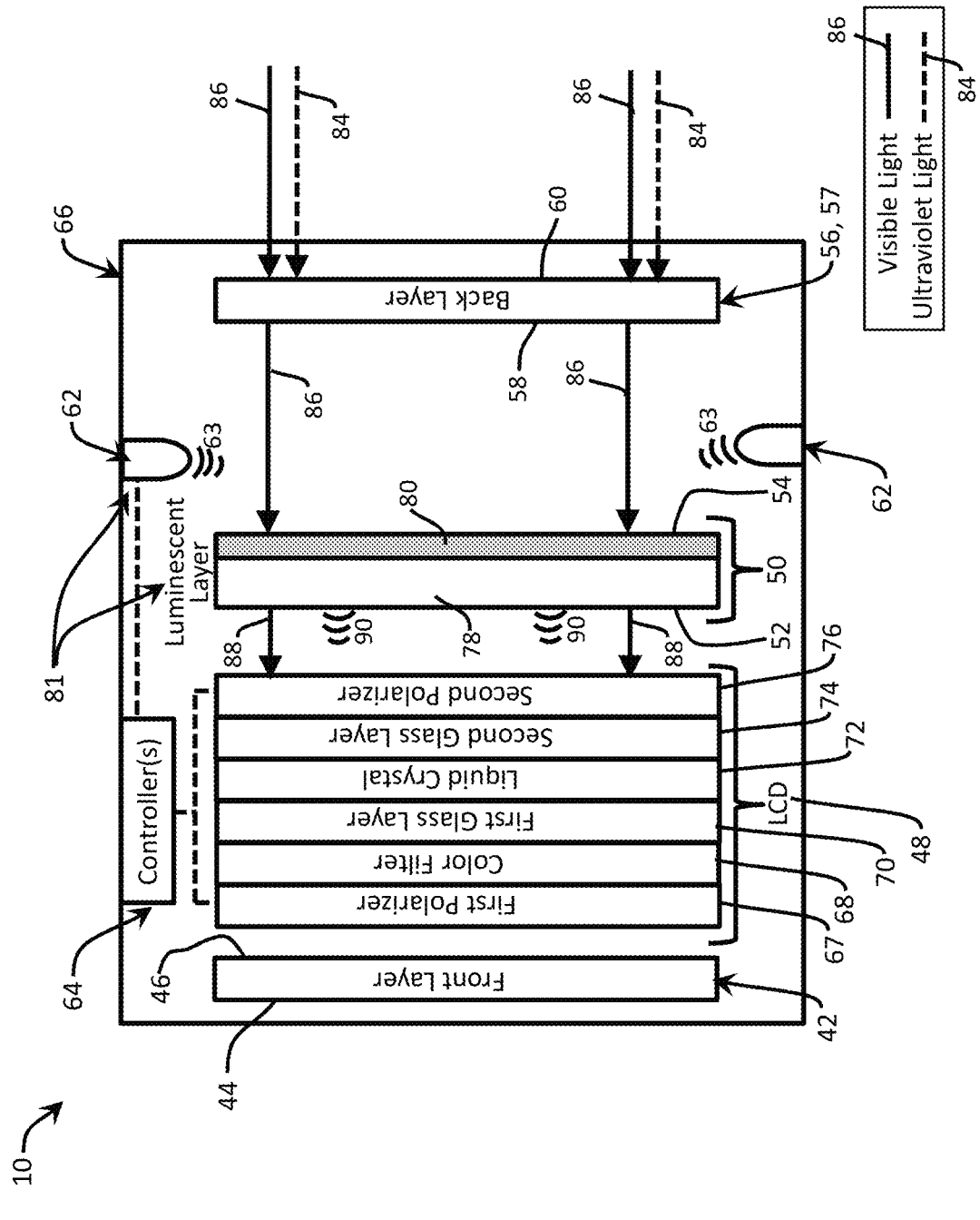
FIG. 4 is a side schematic view of an embodiment of the electronic panel in which the lighting device includes a luminescent layer and a plurality of radiators.

In an embodiment illustrated in FIG. 4, the display device or electronic panel 10 includes: (a) a front substrate or front layer 42 having a forward-facing surface 44 and a backward-facing surface 46; (b) an LCD 48 located behind the backward-facing surface 46; (c) an absorption substrate or luminescent layer 50 located behind the LCD 48, wherein the luminescent layer 50 has a forward-facing surface 52 and a backward-facing surface 54; (d) a back layer 56 located behind the luminescent layer 50, wherein the back layer 56 has a forward-facing surface 58 and a backward-facing surface 60; (e) a plurality of electromagnetic radiation generators or radiators 62; (f) at least one controller 64 operatively coupled to the LCD 48, radiators 62, AC 38 (FIG. 7) and data source 40 (FIG. 7); and (g) a panel housing, support or frame 66 configured to engage, hold and support the front layer 42, LCD 48, luminescent layer 50, back layer 56, radiators 62 and controller 64 in the stacking order illustrated in FIG. 4.

In an embodiment, the front layer 42 and back layer 56 each include a sheet of suitable glass. The glass is see-through. Depending upon the embodiment, the glass can be fully transparent, partially transparent, semi-transparent, tainted or translucent. In an embodiment, the glass includes an anti-glare coating to reduce glare. In an embodiment, the glass is tempered or shatter resistant for protection against environmental elements (e.g., wind, snow, hail, rain and earthquakes), strikes from objects (e.g., birds, balls and other projectiles) and vibration.

The LCD 48 can include any suitable, commercially-available LCD module. In an embodiment, the LCD 48 includes: (a) a first polarizer 67 located behind the backward facing surface 46 of the front layer 44; (b) a color filter 68 located behind the first polarizer 67; (c) a first glass layer 70 located behind the color filter 68; (d) a liquid crystal substance or liquid crystal layer 72 located behind the first glass layer 70; (f) a second glass layer 74 located behind the liquid crystal layer 72; and (g) a second polarizer 76 located behind the second glass layer 74.

The first and second glass layers 70 and 74 sandwich, and encase, the liquid crystal layer 72. The crystals in liquid crystal layer 72 contain molecules which tend to arrange themselves until they point in the same specific direction. Consequently, the crystals are responsive to electric current. Depending upon the electrical current, the crystals untwist to varying degrees to control the passage of light. The liquid crystal layer 72 is arranged in a grid of liquid crystal cells. Each cell corresponds to a pixel. Each pixel has three sub-pixels, one associated with the color red, one associated with the color green and one associated with the color blue.

The first and second polarizers 67 and 76 each includes an array of transparent electrodes. The color filter 68 is a passive, multi-colored film, including separate red, green and blue film areas for each pixel. The controller 64 is operatively coupled to the polarizers 67 and 76. In operation, the controller 64 causes the polarizers 67 and 76 to generated designated electrical currents. These electrical currents can cause: (a) one or more of the pixels to close, preventing the passage of light; (b) one or more of the pixels to open, enabling the passage of light; or (c) particular sub-pixels to enable the passage of light through the red, green or blue film areas of the color filter 68. Based on these electrical currents, the LCD 48 is operable to generate graphical images in color.

Figure 5:
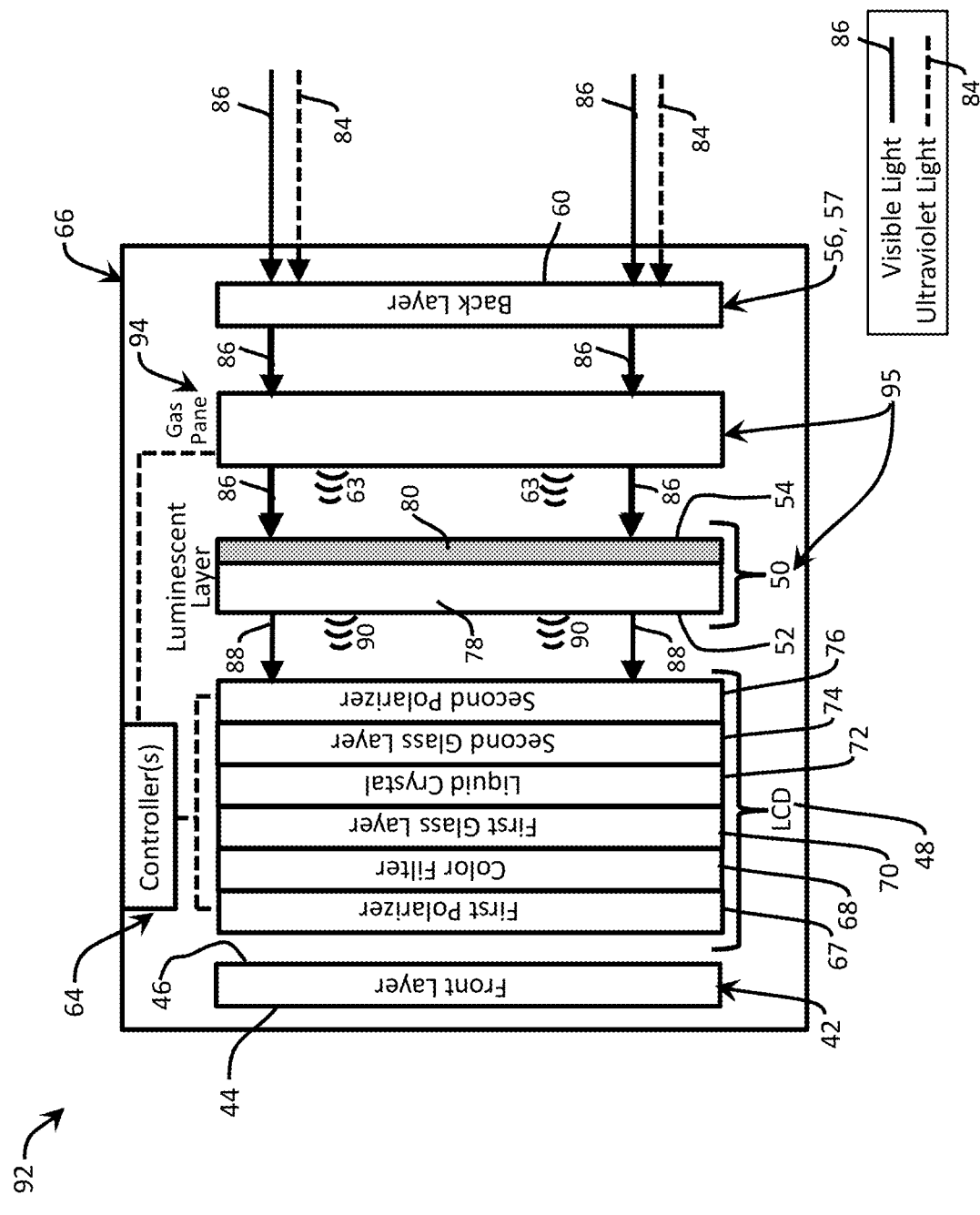
FIG. 5 is a side schematic view of an embodiment of the electronic panel in which the lighting device includes a luminescent layer and a gas pane.
Figure 6:
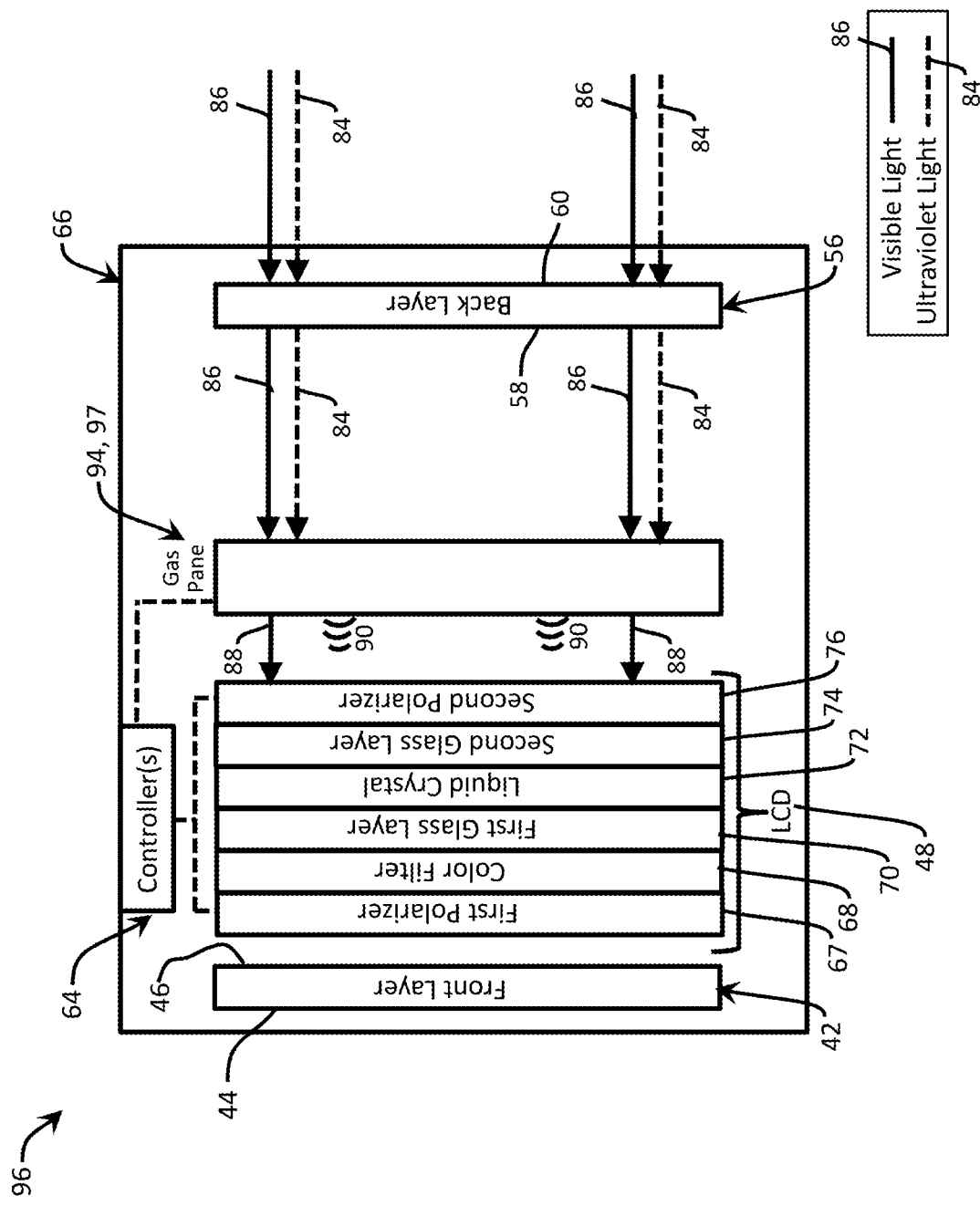
FIG. 6 is a side schematic view of an embodiment of the electronic panel in which the lighting device includes a gas pane.

It should be understood that the LCD 48 does not necessarily have to include the particular components and specific elements illustrated in FIGS. 4-6. For example, depending upon the embodiment, the LCD 48 can: (a) exclude one or more of the following elements: polarizers 67, 76, color filter 68 and glass layers 70, 74; (b) include alternative components which combine the functionalities of one or more of such elements; or (c) include additional components which play a role in achieving LCD functionality.

It should be appreciated that, in an embodiment, the liquid crystal layer 72 does not, by itself, emit light. To illuminate the LCD 48, a source of visible light (e.g., full-spectrum or white light) can be located behind the LCD 48. In an embodiment, the luminescent layer 50 functions as such source of visible light. The luminescent layer 50 includes: (a) a carrier substrate or carrier sub-layer 78; and (b) an absorption sub-layer or luminescent sub-layer 80 applied to or coated on the carrier sub-layer 78. The carrier sub-layer 78 is a suitable, clear or transparent glass substrate.

The luminescent sub-layer 80 includes an element or substance which emits visible light caused by activity other than heating of such substance. Depending upon the embodiment, such activity can include an absorption of photons, a chemical reaction, electrical activity, subatomic motion or stress on a molecule. In an embodiment, the luminescent sub-layer 80 includes a coating which incorporates a substance or material which is operable to absorb non-visible light, including, but not limited to, ultraviolet (UV) light and infrared (IR) light within the wavelength range of 1 μm to 10 nm.

In an embodiment, such coating or luminescent sub-layer 80 includes a fluorescent substance operable to generate visible light. The fluorescent substance has a characteristic associated with a relatively rapid rate of radiation absorption and a relatively rapid, instant or immediate release or emission of visible light. The fluorescent substance enables the luminescent sub-layer 80 to generate visible, white or full-spectrum light in the fashion sometimes described as the "glow-in-the-dark" phenomenon.

In an embodiment, as soon as the fluorescent substance is not exposed to the radiation generated by the radiators 62, the fluorescent substance exhibits a clear, transparent or see-through characteristic. For example, such fluorescent substance can be a clear liquid or a clear solid. During assembly, the assembler can apply the clear fluorescent liquid to the carrier sub-layer 78. When the fluorescent liquid dries, it establishes the luminescent sub-layer 80. As long as such luminescent sub-layer 80 is not exposed to UV light, such luminescent sub-layer 80 remains clear, transparent or see-through. When radiators 62 direct UV light toward such luminescent sub-layer 80, such luminescent sub-layer 80 emits visible, white light giving such luminescent sub-layer 80 a non-transparent or opaque characteristic. This white light has sufficient intensity to illuminate the LCD 48 for ease in viewing LCD-generated images as described below. As soon as radiators 62 are shut off, such luminescent sub-layer 80 stops emitting visible, white light, giving such luminescent sub-layer 80 a clear or transparent characteristic.

It should be understood that, in an embodiment, the fluorescent substance does not continue to glow and emit visible light after the radiation source has been turned off. Once the radiation source is turned off, the fluorescent substance stops glowing and converts from a white appearance to a clear, transparent or see-through appearance.

It should be appreciated that, in contrast to a phosphorous substance, the fluorescent substance quickly or instantly responds to the on/off modes of the radiators 62. The on-mode instantly causes the fluorescent substance to emit visible light, and the off-mode instantly causes the fluorescent substance to stop emitting visible light. For comparison purposes, phosphorous substance exhibits a relatively slow rate of radiation absorption and a relatively gradual, long release or emission of visible light for up to several hours after the original excitation has stopped.

In an embodiment, each radiator 62 includes an electromagnetic energy generator or radiation generator operable to generate non-visible light 63 operable to excite the luminescent layer 50. Depending upon the embodiment, the non-visible light 63 can include UV light or IR light. For example, the radiators 62 can include UV light sources or UV radiators, or the radiators 62 can include IR light sources or IR radiators. In an embodiment, each radiator 62 includes a UV light emitting diode (LED). In operation, the controller 64 turns on the radiators 62, and the radiators 62 direct or transmit radiation toward the luminescent sub-layer 80. In prompt or immediate response, the luminescent sub-layer 80 emits, outputs or generates visible, full-spectrum or white light. This white light illuminates the LCD 48 for image display purposes, as described below. After the controller 64 shuts off the radiators 62, the luminescent sub-layer 80 immediately loses its energy, stops generating the white light and converts to a clear, transparent or see-through medium.

In an embodiment, the radiators 62 and luminescent layer 50 cooperate as a lighting device 81 (FIGS. 4 and 7). As described above, the radiators 62 excite the luminescent layer 50. In response, the luminescent layer 50 generates visible, white light. Therefore, the lighting device 81 outputs this white light for purposes of backlighting the LCD 48.

Figure 8:
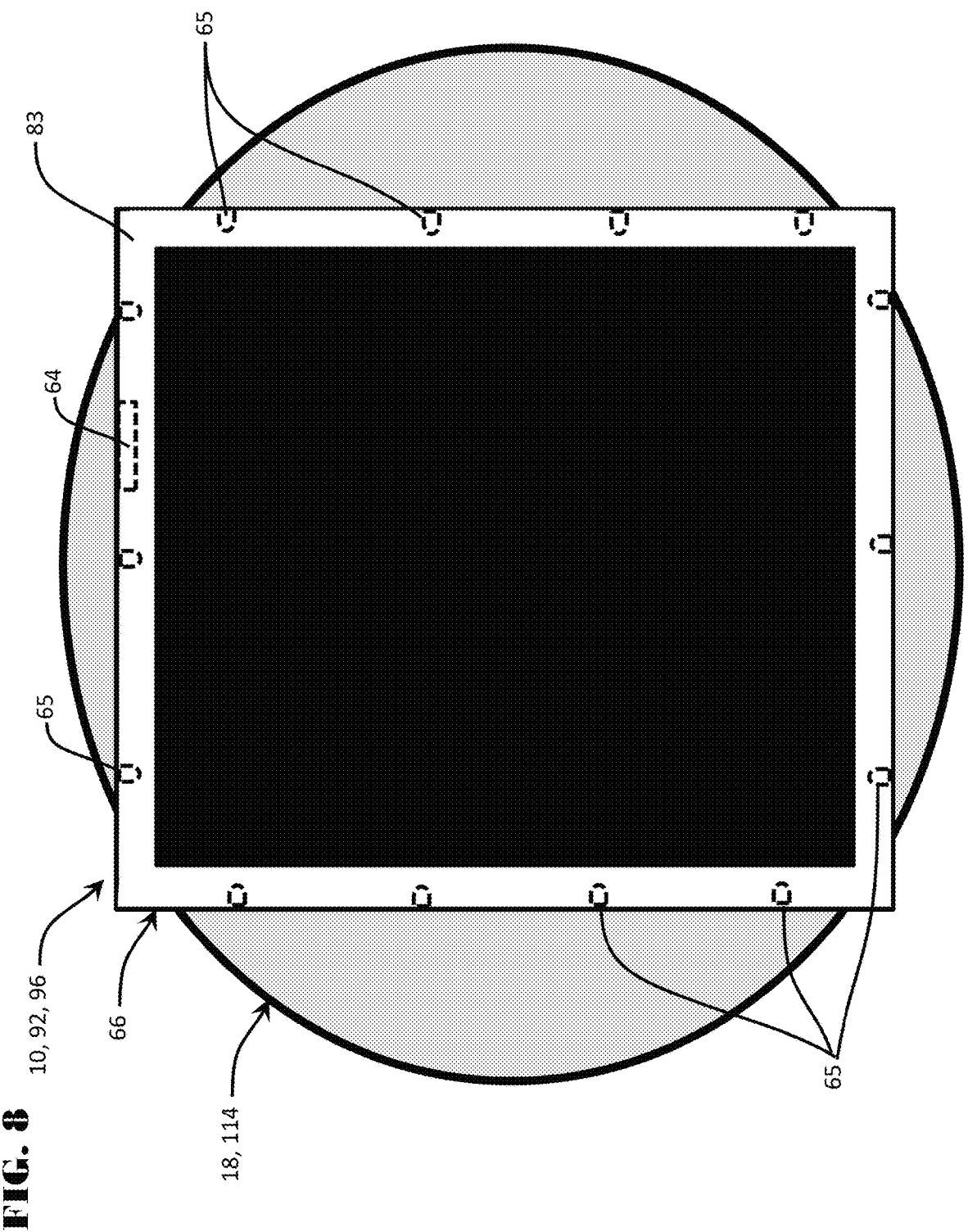
FIG. 8 is a side elevation view of an embodiment of the electronic panel positioned in front of a poster, illustrating the blocking mode.
Figure 9:
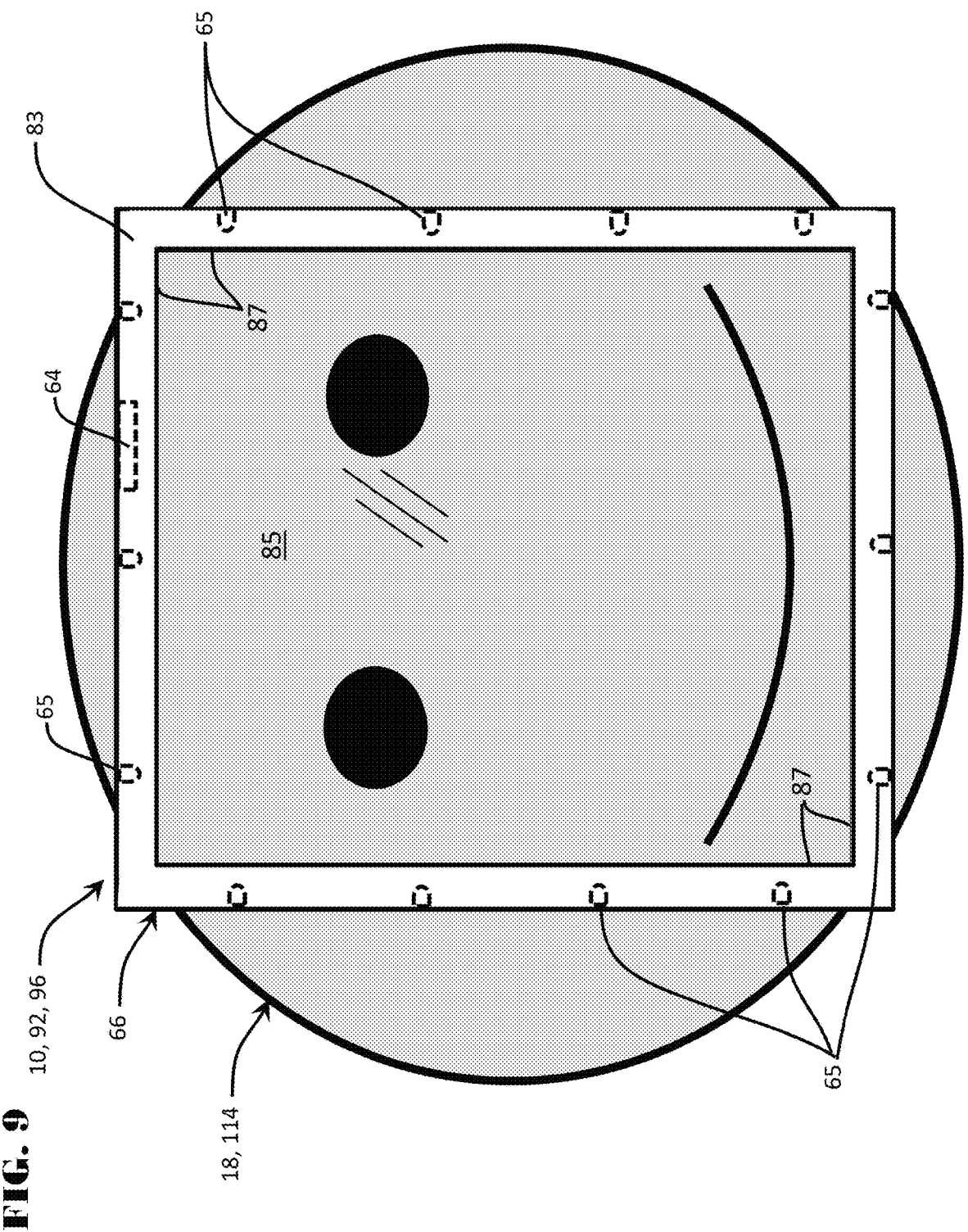
FIG. 9 is a side elevation view of an embodiment of the electronic panel positioned in front of the poster of FIG. 8, illustrating the see-through mode.

In an embodiment illustrated in FIGS. 8-11, the frame 66 defines a frame channel or frame cavity 83. The controller 64 and radiators 62 are housed within the frame 66 and located in the frame cavity 83. As illustrated in FIGS. 4 and 8, the controller 64 and radiators 62 are mounted to the frame 66 so that such components are not in front of or behind any of the layers of the electronic panel 10. In other words, as illustrated in FIG. 9, the controller 64 and radiators 62 are not within the line of sight area, viewing area or image display area 85 defined by the inner frame sections 87 of the frame 66. Accordingly, when the electronic panel 10 is in see-through mode, the controller 64 and radiators 62 are not visible.

Referring again to FIG. 4, the back layer 56, in an embodiment, includes a light filter substrate 57 or light filter layer 57, serving a dual purpose. First, the light filter layer 57 acts as the panel back 14 to protect the internal components of the electronic panel 10. For example, the light filter layer 57 can include a sheet of suitable glass. Second, the light filter layer 57 screens-out, and blocks the entry of, invisible light which might otherwise excite the luminescent sub-layer 80. In an embodiment, the light filter layer 57 includes a UV screening medium operable to prevent UV light from passing through the light filter layer 57. In operation of such embodiment, the light filter layer 57 blocks the radiation wavelengths associated with UV light. The UV blockage enables the controller 64 to solely control the white light function of the luminescent sub-layer 80 without interference from the exterior environment 18 or interior environment 20, as applicable. The controller 64 can perform such sole control by controlling the on/off modes of the radiators 62.

For example, the operation of an embodiment of electronic panel 10 involves the following steps:
(a) An installer installs the electronic panel 10 so that the panel front 12 faces the exterior environment 18 as illustrated in FIG. 1.
(b) The light filter layer 57: (i) prevents the UV light 84 of the light fixtures 24 and interior environment 20 from traveling to the luminescent layer 50; and (ii) enables non-UV, visible light 86 to travel to, and reach, the luminescent layer 50.
(c) If the radiators 62 are powered-off: (i) the luminescent layer 50 is transparent, and the non-UV, visible light 86 passes through the luminescent layer 50 as indicated by light path 88; (ii) such visible light 86 reaches the LCD 48 through light path 88; (iii) the pixel operation of LCD 48 controls whether such visible light 86 is blocked from passing through the LCD 48 or fully or partially passes through the LCD 48; and (iv) the front layer 42 enables any such passing, visible light 86 to exit through the panel front 12.
(d) If the radiators 62 are powered-on: (i) the luminescent layer 50 is non-transparent, generating a visible, white light 90; (ii) the white light 90 and non-UV, visible light 86 collectively travel through light path 88 to reach the LCD 48; (iii) the LCD 48 generates images based on its pixel operation and the backlighting provided by the light 86 and 90 passing through light path 88; and (iv) the front layer 42 enables the image light to exit through the panel front 12 for viewing of the image.

In an embodiment illustrated in FIG. 5, the electronic panel 92 has the same structure, components, materials, functionality and logic of electronic panel 10 except that radiators 62 are removed and replaced with a gaseous illuminator or gas pane 94. The gas pane 94, in an embodiment, is a relatively shallow or thin box constructed of a plurality of clear, transparent or see-through layers, such as suitable sheets of glass. The perimeter edges of the gas pane 94 can be constructed of any suitable material, including, but not limited to, metal, plastic or glass materials having transparent or opaque characteristics. Also, the gas pane 94 includes: (a) an electrical gas exciter mounted to one or more of such perimeter edges; and (b) a suitable, clear, transparent or see-through gas which, when excited or electrically charged, generates UV light or a combination of UV light and visible light, including, but not limited to, white light. The gas exciter is mounted so as not to protrude into the image display area 85 (FIG. 9). As with the radiators 62, the controller 64 controls: (a) the on-mode of the gas pane 94 to generate non-visible light 63 (e.g., UV light) operable to excite the luminescent layer 50 for the purposes described above; and (b) the off-mode of the gas pane 94 to maintain the luminescent layer 50 in a non-excited state, in which the luminescent layer 50 is clear or transparent.

In an embodiment, the gas pane 94 and luminescent layer 50 cooperate as a lighting device 95 (FIGS. 5 and 7). As described above, the gas pane 94 excites the luminescent layer 50. In response, the luminescent layer 50 generates visible, white light. Therefore, the lighting device 95 outputs this white light for purposes of backlighting the LCD 48.

In an embodiment illustrated in FIG. 6, the electronic panel 96 has the same structure, components, materials, functionality and logic of electronic panel 92 except that: (a) the luminescent layer 50 is removed; and (b) the back layer 56 does not necessarily include the light filter layer 57. If the back layer 56 excludes the light filter layer 57, as shown, UV light 84 can pass through the back layer 56. In this embodiment, the gas pane 94 is configured and operable to generate visible, full-spectrum or white light with sufficient intensity to illuminate the LCD 48. Such intensity enables the LCD 48 to generate images which are easily viewable. The controller 64 controls: (a) the on-mode of the gas pane 94 to generate visible white light for purposes of providing backlight to the LCD 48; and (b) the off-mode of the gas pane 94 in which the gas pane 94 is clear, transparent or see-through.

In an embodiment, the gas pane 94 functions as a lighting device 97 (FIGS. 6 and 7). As described above, the gas pane 94, acting as lighting device 97, directly generates visible, white light. Therefore, the lighting device 97 outputs this white light for purposes of backlighting the LCD 48. This white light has sufficient intensity to illuminate the LCD 48 for ease in viewing LCD-generated images.

In an embodiment illustrated in FIG. 7, each of the electronic panels 10, 92 and 96 includes: (a) one or more controllers, such as controller 64; (b) a touch input device or touch panel 100 operatively coupled to the controller 64 to enable users to provide input signals to the controller 64 by touching the touch panel 100; (c) a rechargeable battery 102 electrically coupled to the controller 64 to provide a backup or alternate electrical energy source to the electronic panel 10, 92, 96; (d) one or more internal antennas, such as antenna 103, operatively coupled to the controller 64 to enable the controller 64 to wirelessly send and receive signals through radio frequency (RF) radiation, including, but not limited, to a Bluetooth® antenna module; (e) a power supply unit 104, electrically coupled to the controller 64, operable to receive AC 38 and transform it to direct current (DC) at a level suitable for the controller 64; (f) a plurality of output devices 106 operatively coupled to the controller 64, including, but not limited to, LCD 49, an audio output device or speaker 108 configured to generate sound, and a plurality of output data ports 110, including, but not limited, to an audio port; (g) a lighting device 111 (e.g., lighting device 81, 95 or 97) operatively coupled to the controller 64; (h) one or more photo sensors or light sensors, such as light sensor 113, operatively coupled to the controller 64 and operable to generate different control signals based on the amount of visible light present in the exterior environment 18 or interior environment 20; and (i) a plurality of input devices or input ports 112, operatively coupled to the controller 64 and operable to receive data or electronic signals from a data source 40 or from users.

In an embodiment, controller 64 includes: (a) one or more data processors, such as processor 115; and (b) one or more memory devices, such as memory device 98, operatively coupled to processor 115. Depending upon the embodiment, processor 115 can include one or more control circuits, microprocessors, central processing units (CPUs), integrated circuits, application-specific integrated circuits (ASICs), logic circuitry or other hardware circuit components configured to control the logic and operation of the system 10 by processing data or otherwise executing machine-readable instructions. Also, depending upon the embodiment, the memory device 98 can include one or more data storage devices or other data storage mediums configured to store machine-readable instructions, object code or other computer-readable code as well as data, data libraries and data sets.

Referring to FIGS. 8-11, in an embodiment, the frame 66 houses the controller 64 and one or more additional electronic components 65. Depending upon the embodiment, the additional electronic components 65 can include radiators 62, memory boards, wires or other electrical elements. To enable the see-through mode described below, the controller 64 and electronic components 65 are positioned inside the cavity 83 and outside of the image display area 85.

In an embodiment, electronic panel 10, 92, 96 is operable in a plurality of visibility or viewing modes controlled by the controller 64, including a shutter or blocking mode, a see-through mode, a background mode and a display mode. In the shutter or blocking mode illustrated in FIG. 8, the controller 64 causes the LCD 49 to orient its pixels so that they block the passage of light through the LCD 49. Accordingly, much like window shutters, blinds or curtains, the LCD 49 generates an opaque medium, such as black or gray, to prevent the transparency of the electronic panel 10, 92, 96. Referring to FIGS. 1 and 8, in the example shown, the electronic panel 10, 92, 96 is installed with its panel front 12 facing the exterior environment 18 and the panel back 14 facing the interior environment 20. In this example, the exterior environment 18 includes a physical poster 114 having a circular shape constructed of paper or plastic and painted with a smiley face. In this shutter or blocking mode, the electronic panel 10, 92, 96 blocks the portion of the poster 114 within the image display area 85 (FIG. 9) and prevents the entry of most or all visible light into the interior environment 20.

There are a plurality of different events which can trigger the shutter or blocking mode of the electronic panel 10, 92, 96 as illustrated in FIG. 8. In an embodiment, when the user desires privacy or darkness, the user can provide a blocking mode input using the touch panel 100, other input device 112 or an external device, such as a smartphone, operable to send a signal to the antenna 103. In another embodiment, the electronic panel 10, 92, 96 can be programmed to automatically activate the blocking mode when the light sensor 113 detects a diminished level of light from the exterior environment 18, such as the relatively low amount of visible light occurring in the evening or night. For example, when nightfall begins, electronic panel 10, 92, 96 automatically triggers the blocking mode so as to provide a home occupant or other building occupant with the expected privacy. A change to the blocking mode can be analogous to the closing of blinds or curtains in a building.

There are a plurality of different events which can trigger the transparency or see-through mode of the electronic panel 10, 92, 96 as illustrated in FIG. 9. Depending upon the embodiment, the see-through mode can cause the electronic panel 10, 92, 96 to exhibit transparent visibility, translucent visibility or any other suitable level of visibility in which visible light passes through the electronic panel 10, 92, 96. For example, the front layer 42 (FIG. 4) or light filter layer 57 (FIG. 4) can be tainted or treated with a tainting substance. Even with such tainting, visible light would pass through the electronic panel 10, 92, 96 during the see-through mode.

In an embodiment, when the user desires see-through visibility or viewing, the user can provide a see-through mode input using the touch panel 100, other input device 112 or an external device, such as a smartphone, operable to send a signal to the antenna 103. In another embodiment, the electronic panel 10, 92, 96 can be programmed to automatically initiate the see-through mode when the light sensor 113 detects an increased level of light from the exterior environment 18, such as the relatively high amount of visible light occurring in the morning or daytime. For example, when sunrise begins, electronic panel 10, 92, 96 automatically triggers the see-through mode so as to provide a home occupant or other building occupant with the desired natural light and visibility to the exterior environment 18. As shown in FIG. 9, the see-through mode reveals, and provides visibility to, the poster 114 located behind the image display area 85. A change to the see-through mode can be analogous to the opening of blinds or curtains in a building.

Figure 10:
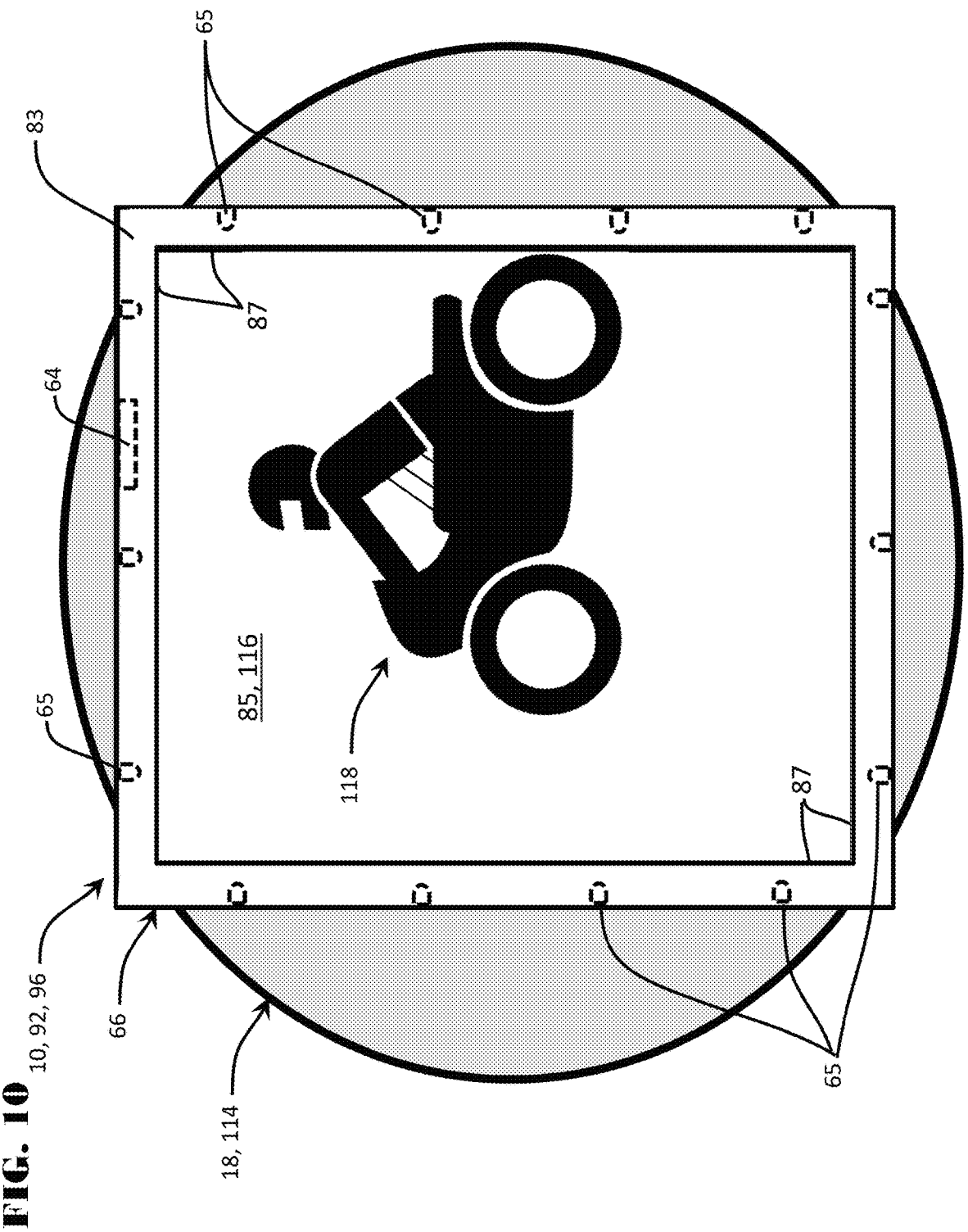
FIG. 10 is a side elevation view of an embodiment of the electronic panel positioned in front of the poster of FIG. 8, illustrating the background mode.
Figure 11:
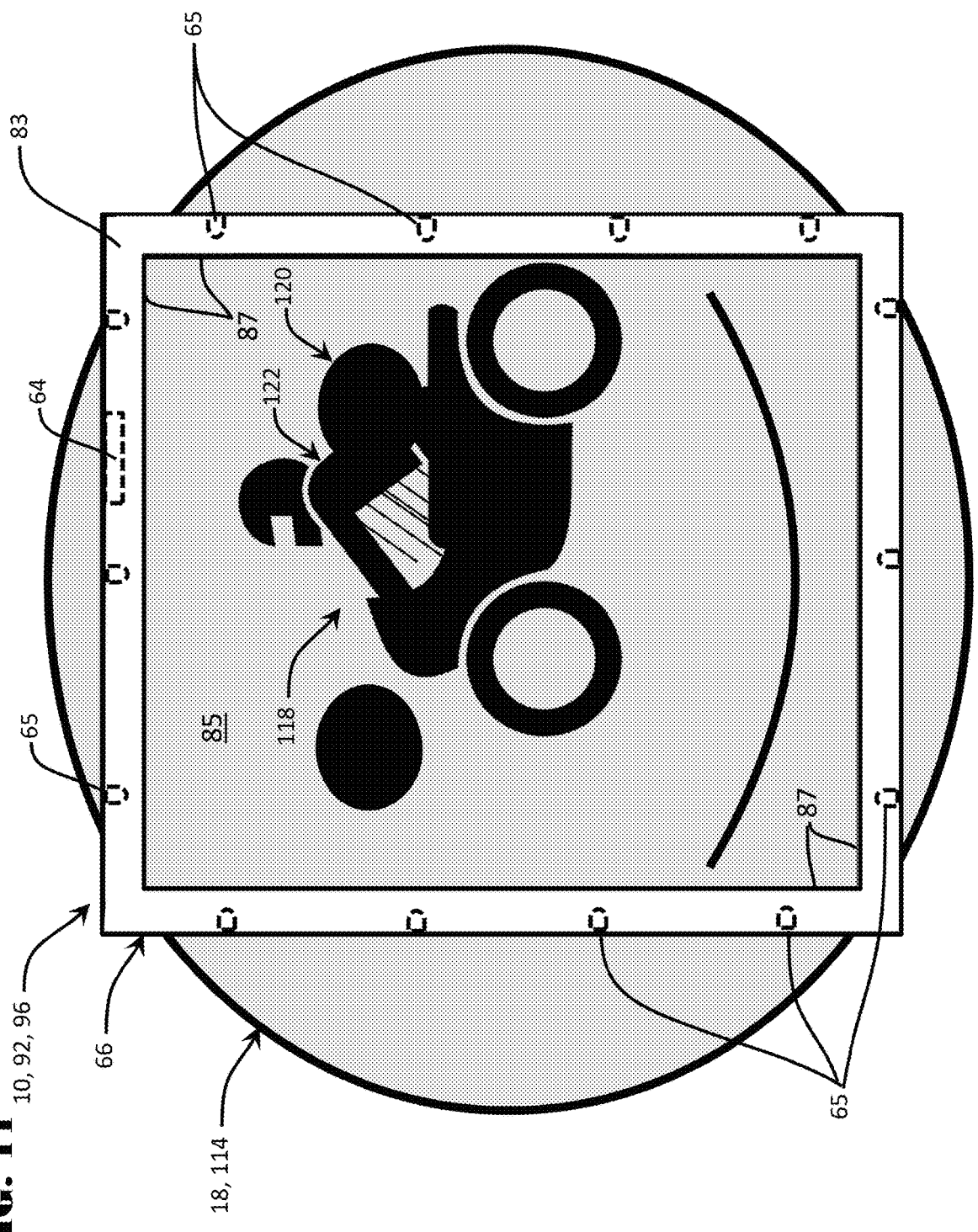
FIG. 11 is a side elevation view of an embodiment of the electronic panel positioned in front of the poster of FIG. 8, illustrating the dual see-through and display mode.
Figure 12:
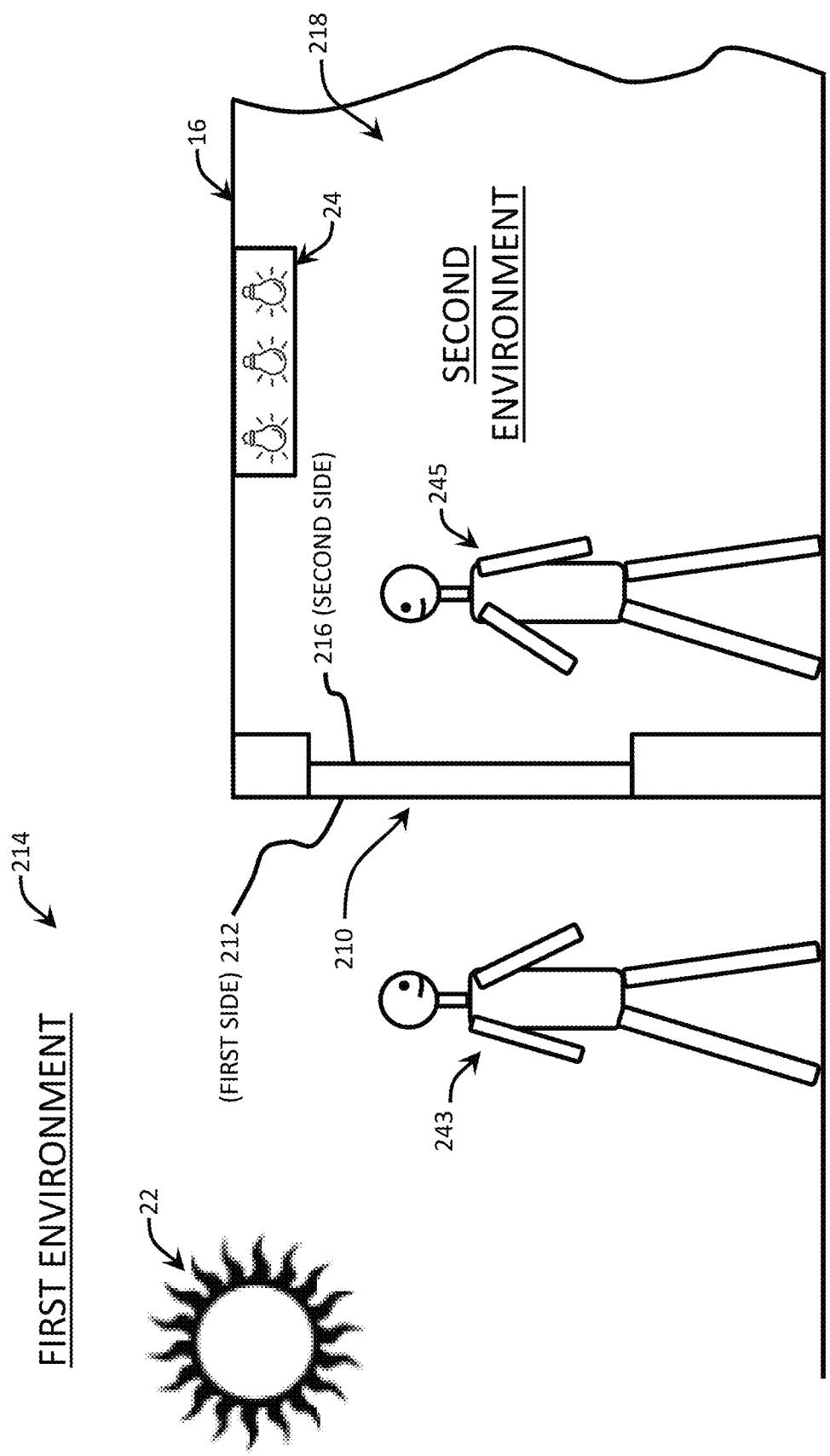
FIG. 12 is a side schematic view of an embodiment of an electronic panel installed in a building such that the first side of the electronic panel faces toward a first environment and the second side of the electronic panel faces in the opposite direction toward a second environment.

In the background mode illustrated in FIG. 10, the controller 64 is operable to radiate the luminescent layer 50, causing the luminescent layer 50 to absorb the radiation and emit visible, white light based on the absorbed radiation. Depending upon the embodiment, the controller 64 can achieve this by: (a) powering on the radiators 62 for the embodiment of electronic panel 10; (b) powering on the radiators 62 and exciting the gas in gas pane 94 for the embodiment of electronic panel 92; or (c) exciting the gas in gas pane 94 for the embodiment of electronic panel 96. In an embodiment, the radiation is UV light, and the emitted visible light includes a white light operable to illuminate LCD 48.

As shown, in the background mode the LCD 48 generates a desktop background image 116 which, in this example, is an opaque, white background covering the entire image display area 85. Depending upon the embodiment, the background image 116 can be white, blue or any other suitable color. In this background mode, the LCD 48 is operable to generate a graphical representation or image 118 viewable by the user. In this example, the image 118 is a motorcycle image viewable by building occupants inside the interior environment 20 (FIG. 1).

It should be understood that the desktop background image 116 can prevent physical objects, such as poster 114, from interfering with the visibility of images generated by the LCD 48, such as motorcycle image 118. For example, without background image 116, the poster 114 could possibly interfere with, or detract from, the full visibility of the image 118. In the example shown in FIG. 11, the motorcycle image 118 overlaps with the eye 120 of the poster 114. In this example, the motorcycle image 118 and eye 120 are both black in color. In this example, this black-on-black overlapping can make it difficult to visually determine whether the eye 120 is part of the cyclist's back image 122 generated by LCD 48. Depending upon the embodiment and display purpose, this difficulty can be a disadvantage when images 118 of one color are displayed in front of physical objects of the same or similar color. In an embodiment, the electronic panel 10, 92, 96 overcomes such disadvantage by generating the background image 116 in the background mode.

It should be appreciated, however, that in other embodiments, the electronic panel 10, 92, 96 is operable in a dual see-through and display mode. In such dual mode, the electronic panel 10, 92, 96 can advantageously generate images without requiring any background images 116. For example, if the eye 120 were yellow, the black motorcycle image 118 (including black back image 122) would be visibly and clearly distinguished from the images 118 and 122.

The blocking mode, see-through mode, background mode, and dual see-through and display mode are operable for the benefit of viewers in interior environments 20, as described above with respect to FIG. 1. For example, viewers in interior environments 20 can use the electronic panel 10, 92, 96 as a window with a blinding and un-blinding feature as well an image generation feature for watching images, videos and television programs. For an electronic panel 10, 92, 96 installed with its panel front 12 in an exterior environment 18 (FIG. 2), such modes are operable for the benefit of viewers in such exterior environments 18 as well as viewers in such interior environments 20. For example, viewers in interior environments 20 can use the electronic panel 10, 92, 96 as a window with a blinding and un-blinding feature. At the same time, such electronic panel 10, 92, 96 can display images, videos and television programs (e.g., advertisements and commercials) to viewers in the exterior environment 20.

Depending upon the embodiment, the electronic panel 10, 92, 96 can incorporate or embody a monitor, a screen, a display device, a television, an appliance, a communication device, a computer or any other apparatus operable to electronically generate or produce graphics, videos or other images. In an embodiment, such television includes all of the components of a commercially available, Internet-enabled television, including, but not limited to, a digital television (DTV) receiver, a tuner, a demodulator, an audio decoder, a video decoder, a program and system information (PSI) and system information protocol (PSIP) database and decoder, a channel map, and random access memory (RAM) or flash memory coupled to the channel map.

In an embodiment, such computer includes all of the components of a commercially available computer, including, but not limited to, a motherboard, CPU, read only memory (ROM), RAM, operating system, one or more data buses and a plurality of input/output (I/O) devices.

Referring back to FIG. 7, in an embodiment, the memory device 98 can be fully or partially incorporated into a database or server associated with the building 16, and the controller 64 can access such server over any suitable type of network. Depending upon the embodiment, the network can include one or more of the following: a wired network, a wireless network, a local area network (LAN), an extranet, an intranet, a wide area network (WAN) (including, but not limited to, the Internet), a virtual private network (VPN), an interconnected data path across which multiple devices may communicate, a peer-to-peer network, a telephone network, portions of a telecommunications network for sending data through a variety of different communication protocols, a Bluetooth communication network, a radio frequency (RF) data communication network, an infrared (IR) data communication network, a satellite communication network or a cellular communication network for sending and receiving data through short messaging service (SMS), multimedia messaging service (MMS), hypertext transfer protocol (HTTP), direct data connection, Wireless Application Protocol (WAP), email or any other suitable message transfer service or format.

In an embodiment, the memory device 98 can include one or more data storage devices, including, but not limited to, a hard drive with a spinning magnetic disk, a Solid-State Drive (SSD), a floppy disk, an optical disk (including, but not limited to, a CD or DVD), a RAM device, a ROM device (including, but not limited to, programmable read-only memory (PROM), electrically erasable programmable read-only memory (EPROM), electrically erasable programmable read-only memory (EEPROM)), a magnetic card, an optical card, a flash memory device (including, but not limited to, a USB key with non-volatile memory, any type of media suitable for storing electronic instructions or any other suitable type of computer-readable storage medium.

The touch panel 100, output devices 106 and input devices 112 of electronic panel 10, 92, 96 can incorporate the components of any device operable to communicate with the controller 64, including, but not limited to, the components of a personal computer (PC) (including, but not limited to, a desktop PC, a laptop or a tablet), smart television, Internet-enabled television, person digital assistant, smartphone, cellular phone or mobile communication device. In one embodiment, output devices 106 and input devices 112 have at least one input device (including, but not limited to, touchscreen or touch panel 100, a keyboard, a microphone, a sound sensor, a speech recognition device or remote control) and at least one output device (including, but not limited to, speaker 108 and LCD 49).

In an embodiment, the computer-readable instructions, algorithms and logic stored in memory device 98 or otherwise accessed by controller 64 are implemented with any suitable programming or scripting language, including, but not limited to, C, C++, Java, COBOL, assembler, PERL, Visual Basic, SQL Stored Procedures or Extensible Markup Language (XML). The system 10 can be implemented with any suitable combination of data structures, objects, processes, routines or other programming elements.

In an embodiment, the controller 64 is operable to generate a Graphical User Interface (GUI) structured based on a suitable programming language. The GUI can include, in an embodiment, multiple windows, pull-down menus, buttons, scroll bars, iconic images, wizards, the mouse symbol or pointer, and other suitable graphical elements. In one embodiment, the GUI incorporates multimedia, including, but not limited to, sound, voice, motion video and virtual reality interfaces to generate outputs of the electronic panel 10, 92, 96.

In an embodiment, the memory devices and data storage devices described above can be non-transitory mediums that store or participate in providing instructions to the controller 64 or another processor for execution. Such non-transitory mediums can take different forms, including, but not limited to, non-volatile media and volatile media. Non-volatile media can include, for example, optical or magnetic disks, flash drives, and any of the storage devices in any computer. Volatile media can include dynamic memory, such as main memory of a computer. Forms of non-transitory computer-readable media therefore include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read programming code and/or data. Many of these forms of computer readable media may be involved in carrying one or more sequences of one or more instructions to a processor for execution. In contrast with non-transitory mediums, transitory physical transmission media can include coaxial cables, copper wire and fiber optics, including the wires that comprise a bus within a computer system, a carrier wave transporting data or instructions, and cables or links transporting such a carrier wave. Carrier-wave transmission media can take the form of electric or electromagnetic signals, or acoustic or light waves such as those generated during RF and IR data communications.

In an embodiment, some of the components, parts and hardware of the electronic panel 10, 92, 96 are opaque. For example, the electronic panel 10, 92, 96 can include opaque circuit boards, memory boards and wires. In an embodiment, all portions of these opaque components are housed and located within the cavity 83 (FIG. 8) of the frame 66. Consequently, such components are not visible to viewers when the electronic panel 10, 92, 96 is operated in the see-through mode.

In another embodiment illustrated in FIGS. 12-15, the electronic panel 210 has: (a) a first side 212 configured to face toward a first environment 214; and (b) a second side 216 configured to face toward a second environment 218. In the example shown in FIG. 12, the first environment 214 is the outdoor environment including visible sunlight from the sun 22. Also, in such example, the second environment 218 is an indoor environment including artificial, visible light from the light fixture 24. It should be appreciated that, depending on the embodiment, either of the first and second environments 214, 218 can be an outdoor environment or an indoor environment. Also, in an embodiment, both of the first and second environments 214, 218 can be outdoor environments, or both of the first and second environments 214, 218 can be indoor environments.

Figure 13:
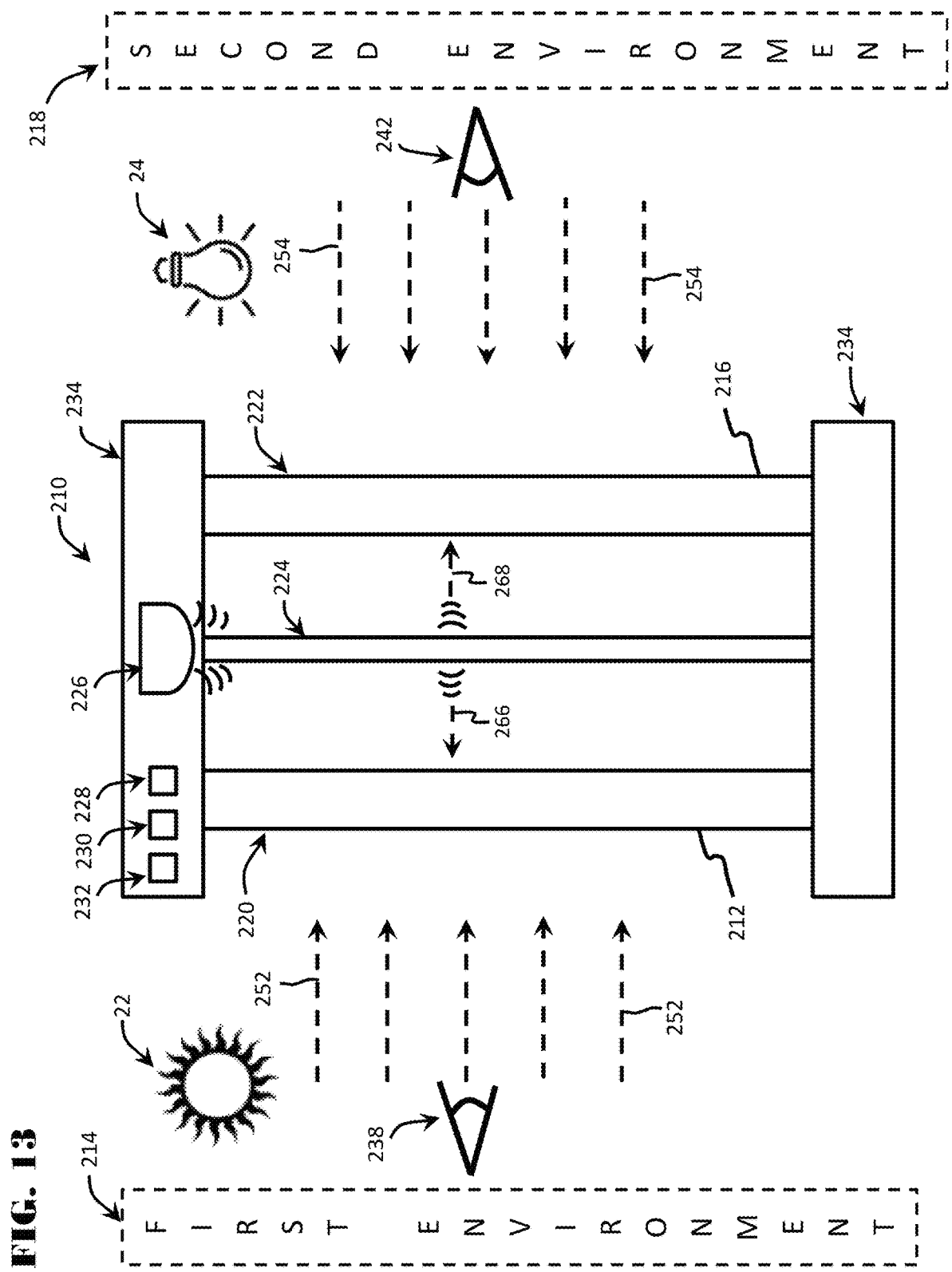
FIG. 13 is a schematic diagram of an embodiment of the electronic panel of FIG. 12, illustrating the internal components of the electronic panel and the flows of the first environmental light paths, second environmental light paths, first reflected light paths, and second reflected light paths.

Referring to FIG. 13, in an embodiment, the electronic panel 210 includes: (a) a first display device 220 having the first side 212; (b) a second display device 222 having the second side 216; (c) a multi-state device 224 positioned between the first and second display devices 220, 222; (d) a light source 226 configured to generate visible light; (e) at least one processor 228 operatively coupled to the first and second display devices 220, 222, the multi-state device 224, and the light source 226; (f) a program storage device 230 operatively coupled to the processor 228; (g) an electric power supplier 232 electrically coupled to the processor 228; and (h) a support structure 234 configured to support the first and second display devices 220, 222, the multi-state device 224, the light source 226, the program storage device 230, and the electric power supplier 232.

Figure 14:
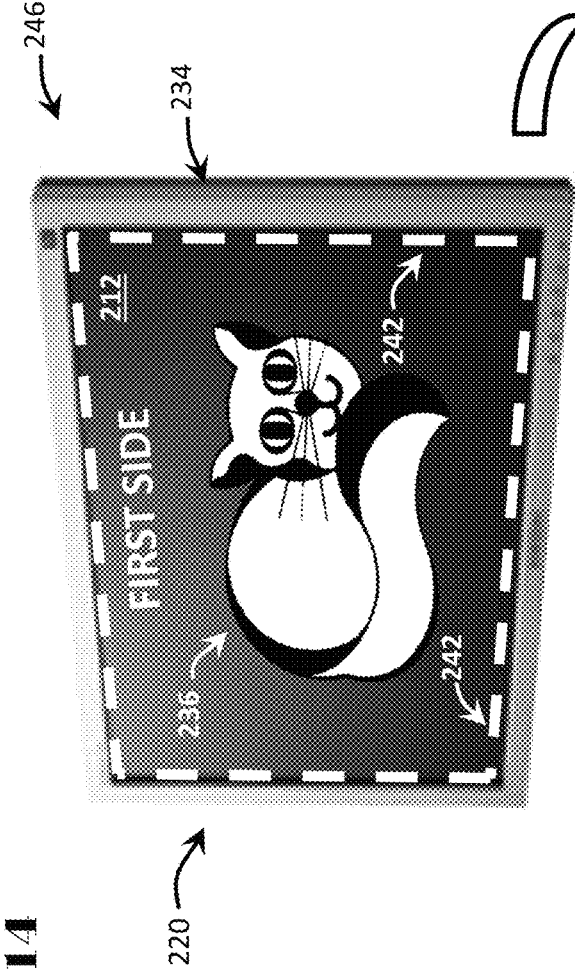
FIG. 14 is a front isometric view of an embodiment of the electronic panel of FIG. 12, illustrating the first side displaying a first image in a first display mode.
Figure 15:
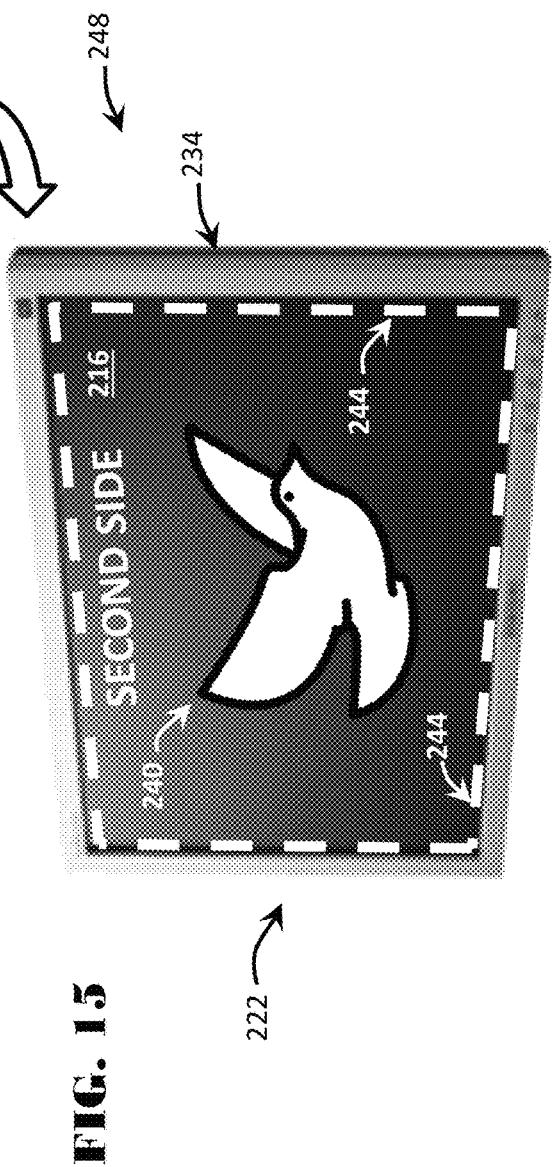
FIG. 15 is a front isometric view of an embodiment of the electronic panel of FIG. 12, illustrating the second side displaying a second image in a second display mode.

Referring to FIGS. 14-15, the first display device 220 is configured and operable to generate a first image 236 that is viewable from a viewing point 238 (FIG. 13) within the first environment 214. Likewise, the second display device 222 is configured and operable to generate a second image 240 that is viewable from a viewing point 242 (FIG. 13) within the second environment 218. Under control of the processor 228, the first and second display devices 220, 222 are configured to simultaneously display the first and second images 236, 240. Accordingly, a person 243 (FIG. 12) in the first environment 214 can view the first image 236 while another person 245 (FIG. 12) in the second environment 218 views the second image 240.

In an embodiment, the electronic panel 210 has a display region that is located within, is bound by, and extends to first and second image-generation perimeters 242, 244. In an embodiment, the first display device 220 is operable to display the first image 236 within the first image-generation perimeter 242. In this embodiment, all images generated by the first display device 220 are positioned within the first image-generation perimeter 242. Likewise, the second display device 222 is operable to display the second image 240 within the second image-generation perimeter 244. In this embodiment, all images generated by the second display device 222 are positioned within the second image-generation perimeter 244.

In an embodiment, the multi-state device 224 is configured to change (or be changed) between a reflection state and a transmission state. In the reflection state, the multi-state device 224 has an opaque characteristic. In the transmission state, the multi-state device 224 has a transmission characteristic.

The program storage device 230, in an embodiment, stores a plurality of computer-readable, machine-readable or processor-executable instructions. Depending on the embodiment, the program storage device 230 can be a memory device or embedded circuitry (e.g., an integrated circuit) that stores or specifies logic or instructions as well as data. The processor 228 is configured to function in accordance with the instructions of the program storage device 230. In an embodiment, the processor 228, based on such instructions, is configured to activate (and switch between) a plurality of different modes, including a first display mode 246 (FIG. 14), a second display mode 248 (FIG. 15), and a see-through mode 250 (FIGS. 16-17).

In the first display mode 246, the processor 228 causes the multi-state device 224 to have a reflection state. When the first display device 220 displays the first image 236 in the first display mode 246, the multi-state device 224 at least partially reflects the visible light from the light source 226, resulting in first reflected light 266 (FIG. 13). The first reflected light 266 facilitates the display of the first image 236 for enhanced viewing from the view point 238 within the first environment 214.

In the second display mode 248, the processor 228 causes the multi-state device 224 to have a reflection state. When the second display device 222 displays the second image 240 in the second display mode 248, the multi-state device 224 at least partially reflects the visible light from the light source 226, resulting in second reflected light 268 (FIG. 13). The second reflected light 268 facilitates the display of the second image 240 for enhanced viewing from the view point 242 within the second environment 218.

Referring to FIGS. 16-17, in the see-through mode 250, the processor 228 causes the multi-state device 224 to have a transmission state. In the see-through mode, the first and second display devices 220, 222 and the multi-state device 224 are configured to enable first environmental light 252 from the first environment 214 to pass through the first display device 220, through the multi-state device 224, through the second display device 222, and to the second environment 218, as illustrated in FIG. 16.

While in the see-through mode, at the same time the first environmental light 252 passes to the second environment 218, the first and second display devices 220, 222 and the multi-state device 224 are configured to enable second environmental light 254 from the second environment 218 to pass through the second display device 222, through the multi-state device 224, through the first display device 220, and to the first environment 214, as illustrated in FIG. 17. Accordingly, in the see-through mode, the electronic panel 210 is translucent, transparent or otherwise see-through.

Like a window in a building, when the electronic panel 210 is in the see-through mode, people on opposite sides of the electronic panel 210 can see each other. Therefore, a person 243 (FIG. 12) standing at one side 212 of the electronic panel 210 can peer through the electronic panel 210 and see another person 245 (FIG. 12) standing at the opposite side 216 of the electronic panel 210.

In another embodiment, the processor 228 is programmed to activate a blockage mode or privacy mode. Depending upon the embodiment, the privacy mode can be associated with minimal, low or no power consumption by the electronic panel 210. In another embodiment, the processor 228, in the privacy mode, causes the multi-state device 224 to have the reflection state by eliminating electric power to, and de-energizing, the multi-state device 224. At the same time, the processor 228 eliminates electric power to, and de-energizes, the first and second display devices 220, 222. In such privacy mode, the multi-state device 224 is opaque or has an opaque characteristic. Similar to blinds or curtains for a window, the opacity of the multi-state device 224 prevents or inhibits a person from seeing through the electronic panel 210. In another embodiment, the processor 228, in the privacy mode, energizes the multi-state device 224, the first display device 220, the second display device 222 or a combination of such devices 224, 220, 222 to establish an opacity that prevents or inhibits a person from seeing through the electronic panel 210. It should be appreciated that, depending on the embodiment, the processor 228 can establish the privacy mode by energizing or de-energizing the multi-state device 224, the first display device 220, the second display device 222 or a combination of such devices 224, 220, 222.

Referring back to FIG. 13, the electric power supplier 232 includes an energy device or energy module. Depending on the embodiment, the energy module can include a battery, an AC/DC converter or any other suitable device configured to be electrically coupled to an energy source. The energy source can include, but is limited to, an electrical power cord carrying electricity, a solar power generation source or any other suitable energy source. The support structure 234 includes a housing portion defining one more cavities configured to hold or house part or all of the processor 228, program storage device 230, and electric power supplier 232.

Figure 18:
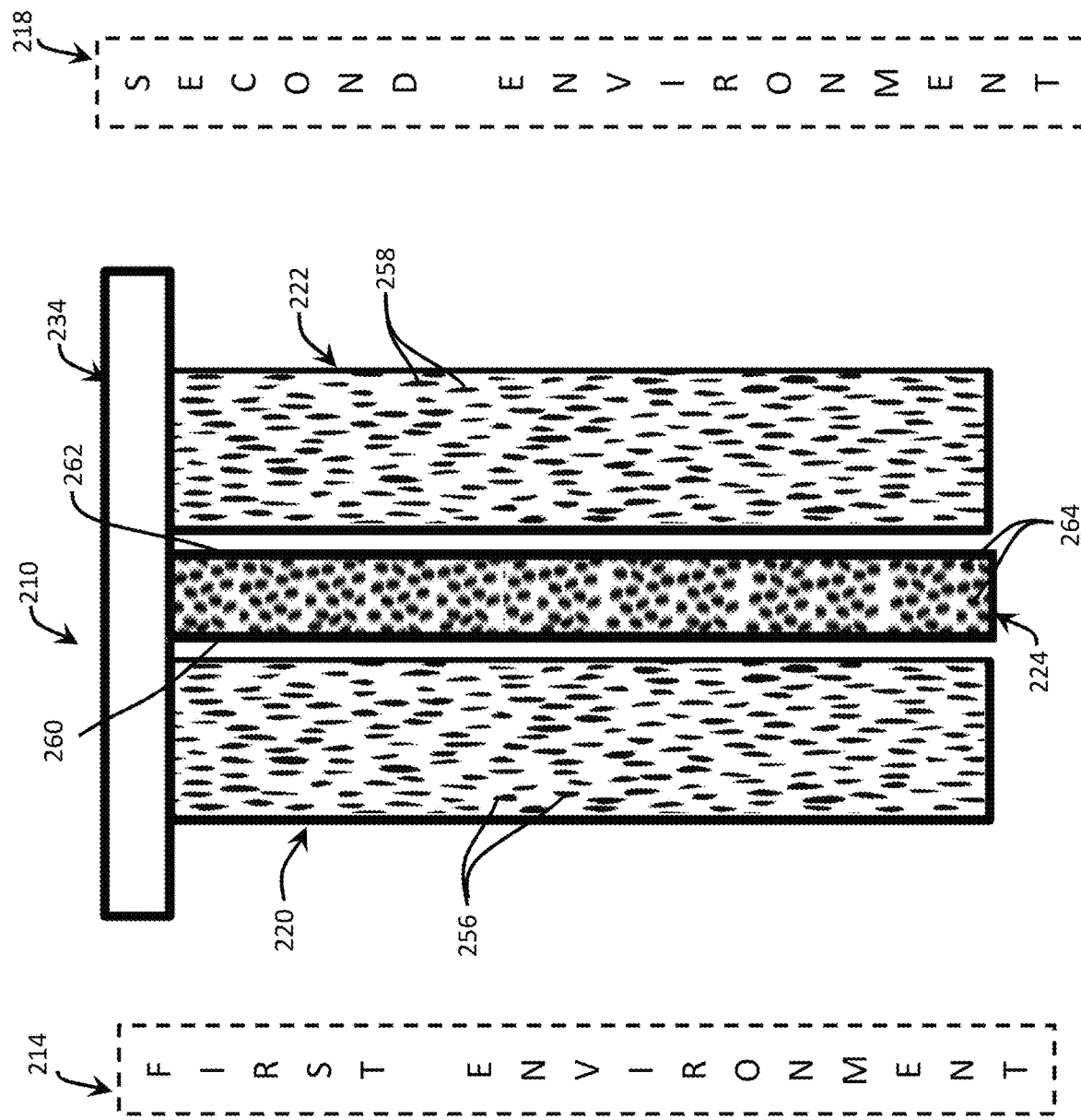
FIG. 18 is a schematic diagram of an embodiment of the electronic panel of FIG. 12, illustrating the liquid crystals of the first display device, the liquid crystals of the second display device, and the polymer dispersed liquid crystals (PDLCs) of the multi-state device.

In an embodiment illustrated in FIG. 18, each of the first and second display devices 220, 222 is an LCD or otherwise includes an LCD. In such embodiment, each of the first and second display devices 220, 222 includes a plurality of liquid crystals 256, 258, respectively.

In the embodiment illustrated in FIG. 18, the multi-state device 224 includes a plurality of layers 260, 262. Each layer can be constructed of glass, plastic or any impermeable polymer. Each layer can be rigid, semi-rigid or flexible. In an embodiment, each of the layers 260, 262 is transparent. In an embodiment, each of the layers 260, 262 is substantially transparent, translucent or otherwise see-through. The multi-state device 224, in an embodiment, also includes a plurality of polymer dispersed liquid crystals (PDLCs) 264 (FIG. 18) sandwiched, entrapped or housed between such layers 260, 262. In addition, the the multi-state device 224 includes an electrical element configured to electrically or electronically charge, polarize, manipulate or reposition the PDLCs 264. The electrical element includes a power switch. When changed to power-on, the switch is operable to supply electric power to the multi-state device 224 for an energized condition or on-condition. When changed to power-off, the switch is operable to shut-off electric power to the multi-state device 224 for a de-energized condition or off-condition. The processor 228 is configured to switch the multi-state device 224 between the on-condition and off-condition. In an embodiment, when the multi-state device 224 is on, the multi-state device 224 has the light transmission characteristic described above. When the multi-state device 224 is off, the multi-state device 224 has the opaque characteristic described above. In another embodiment, when the multi-state device 224 is on, the multi-state device 224 has the opaque characteristic described above, and when the multi-state device 224 is off, the multi-state device 224 has the light transmission characteristic described above.

In an embodiment, the multi-state device 224 has the materials, specifications, structure and functionality of any commercially-available smart film product, switchable film product or smart glass product, including, but not limited to, a glass product based on PDLC technology having a power-on transparent mode and a power-off opaque mode. Such product is configured to adjust light transmission between transparent and opaque using AC power. In the power-off opaque mode, the PDLCs are disordered. This prevents light from penetrating through the film, rendering the film opaque. In the power-on transparent mode, the electricity forces the PDLCs into a designated alignment, rendering the film transparent or see-through.

Figure 19:
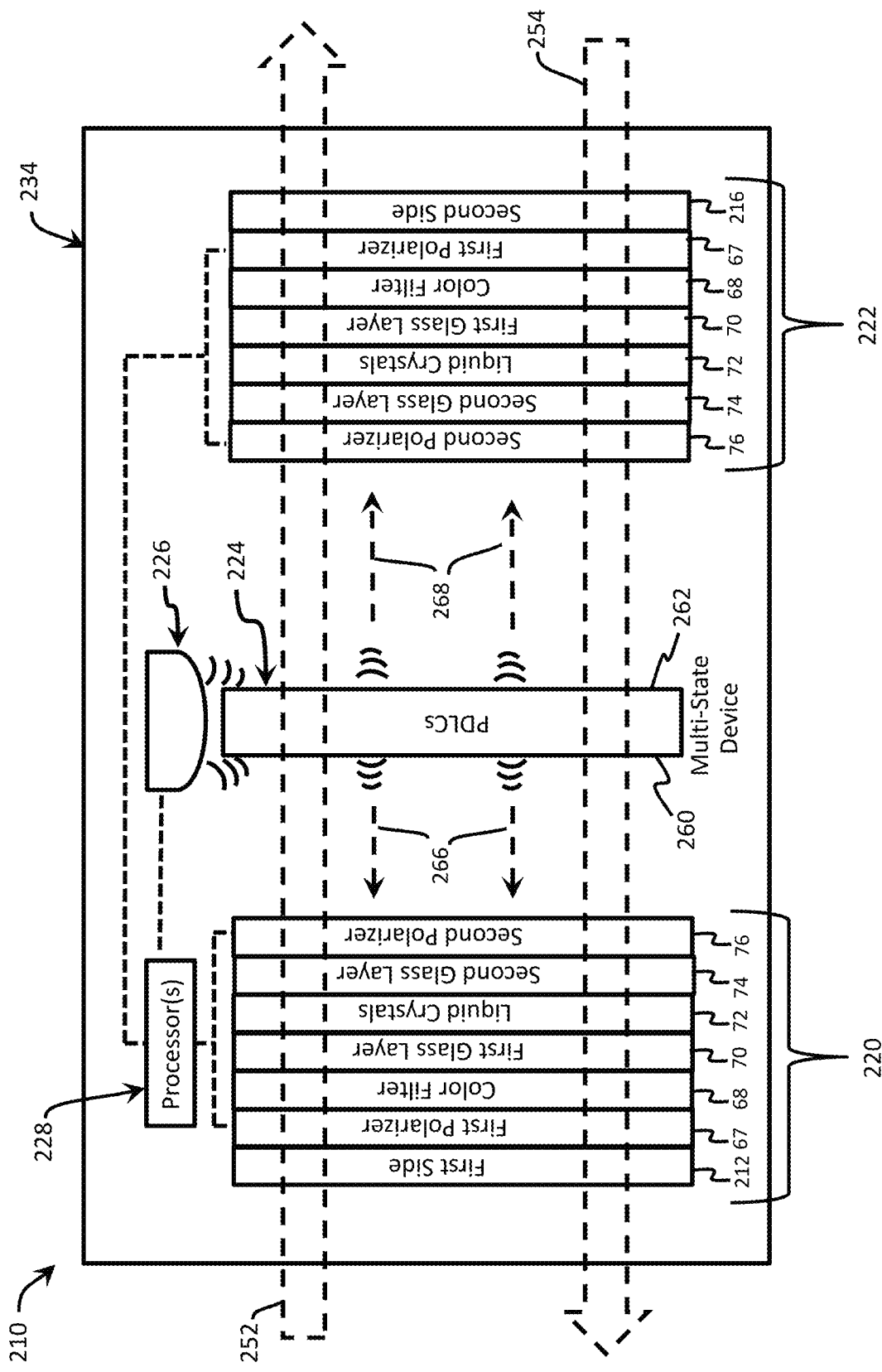
FIG. 19 is a schematic diagram of an embodiment of the electronic panel of FIG. 12, illustrating the components of the first and second display devices, the passage of first environmental light and second environmental light during a see-through mode, and the flow of reflected light during display modes.

Referring to FIG. 19, in an embodiment, the multi-state device 224 is positioned between the first and second display devices 220, 222. In the see-through mode 250 (FIGS. 16-17), the first and second environmental lights 252, 254 pass entirely through the display regions of the electronic panel 210, including the multi-state device 224. In the first display mode 246 (FIG. 14), the light source 226 directs artificial, visible light toward the layer 260. The layer 260 functions as a reflector, directing a portion of such light (first reflected light 266) toward the display device 220. In this way, the first reflected light 266 provides backlighting for the display device 220, enhancing the visibility of the images generated by the display device 220.

In the second display mode 248 (FIG. 15), the light source 226 directs artificial, visible light toward the layer 262. The layer 262 functions as a reflector, directing a portion of such light (second reflected light 268) toward the display device 222. In this way, the second reflected light 268 provides backlighting for the display device 222, enhancing the visibility of the images generated by the display device 222.

Figure 20:
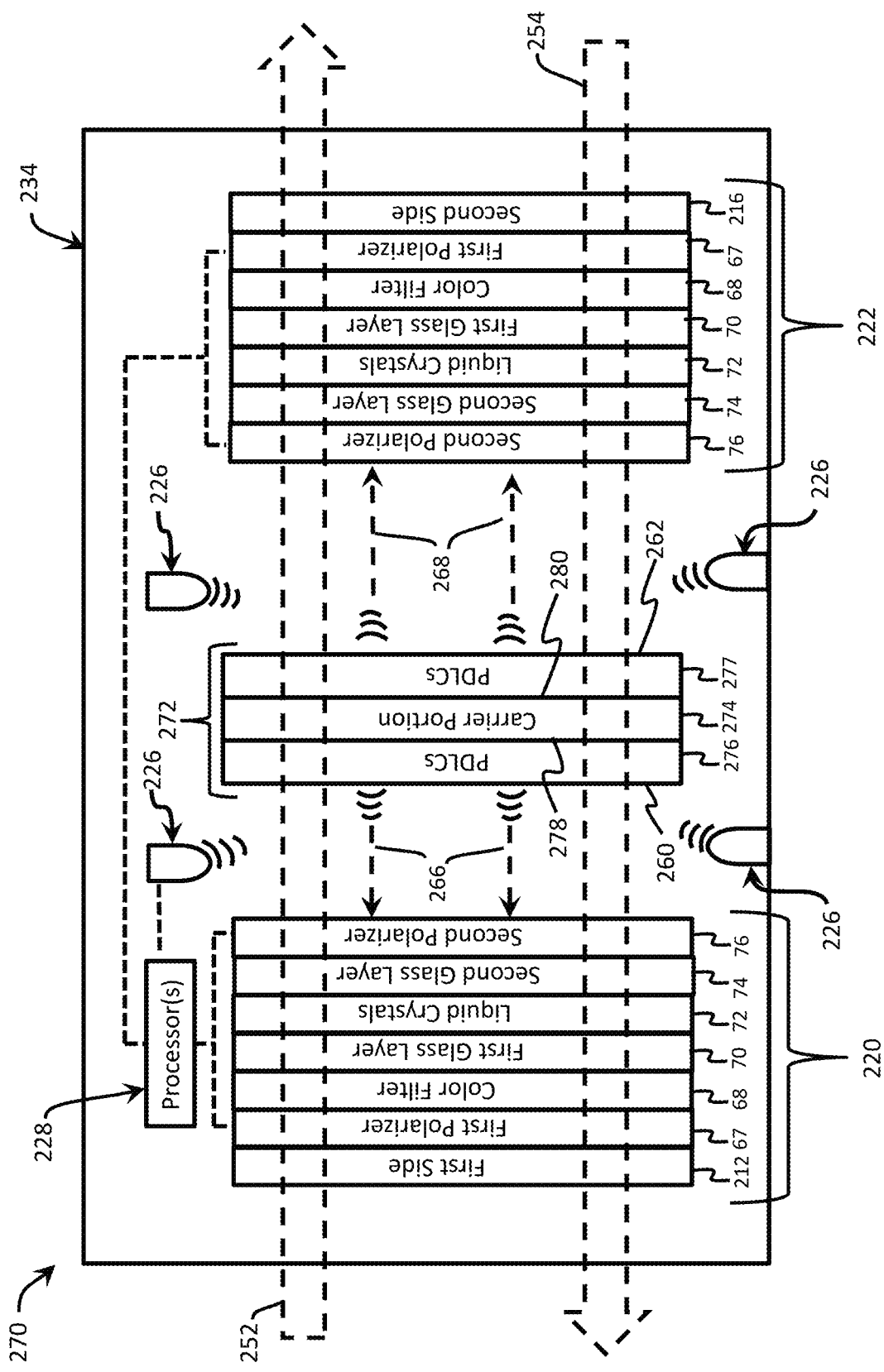
FIG. 20 is a schematic diagram of an embodiment of the electronic panel of FIG. 12, illustrating the components of the first and second display devices, the components of an embodiment of a multi-state assembly, the passage of first environmental light and second environmental light during a see-through mode, and the flow of reflected light during display modes.

In an embodiment illustrated in FIG. 20, the electronic panel 270 has the same structure, elements, configuration and functionality as the electronic panel 210 except that the multi-state device 224 is replaced with the multi-state assembly 272. In this embodiment, the multi-state assembly 272 includes a carrier layer, support layer or carrier portion 274, a first multi-state device 276 coupled to the carrier portion 274, and a second multi-state device 277 coupled to the carrier portion 274.

In an embodiment, the carrier portion 274 is a translucent, transparent or otherwise see-through substrate or layer, such as glass. As shown in FIG. 20, the carrier portion 274 includes: (a) a first carrier side 278 configured to face toward the first display device 220; and (b) a second carrier side 280 configured to face toward the second display device 222. The first multi-state device 276 is engaged with or coupled to the first carrier side 278, and the second multi-state device 277 is engaged with or coupled to the second carrier side 280.

The inclusion of multiple multi-state devices 276, 277 increases the opacity of the multi-state assembly 272 when the multi-state assembly 272 is in the reflection state. The increased opacity causes an increase in the magnitude and strength of the reflected light 266, 268. Furthermore, the inclusion of multiple light sources 226, as shown in FIG. 20, increases the magnitude of the reflected light 266, 268. The increase in the reflected light 266, 268 increases the backlighting of the display devices 220, 222 which, in turn, enhances the quality and visibility of the images generated by the display devices 220, 222.

In an embodiment, each of the electronic panels 210, 270 includes a light sensor that is operatively coupled to the processor 228. The sensor detects sunrise and nightfall. As described below, the processor 228 causes the electronic panels 210, 270 to switch between privacy mode and see-through mode 250 based on signals received from such sensor.

In accordance with the instructions of the program storage device 230, the processor 228 is programmed to control the display modes, see-through mode and privacy mode of the electronic panels 210, 270. For example, a store owner may replace one or more of the owner's standard glass windows with one or more sheets of electronic panels 210, 270. The owner can program the electronic panels 210, 270 to automatically active the see-through mode 250 at 8 am in the morning and automatically switch to the first display mode 246 at 8 pm in the evening. In this example, during the daytime, pedestrians can peer through the electronic panels 210, 270 and window shop, looking at the merchandise in the store. After the store closes in the evening, the first sides 212 of the electronic panels 210, 270 can display digital advertising, including images and videos that advertise products or services of the store owner or of advertisers or companies who contract with the owner for the owner's advertising services.

In another example, a home owner may replace one or more of the owner's standard glass windows with one or more sheets of electronic panels 210, 270. The owner can program the electronic panels 210, 270 to: (a) automatically active the see-through mode 250 when the light sensor provides the processor 228 with a daytime signal; (b) automatically switch to the second display mode 248 based on an input from the owner, causing the second side 216 to display videos, online content, or television generated by the second display device 222; (c) automatically switch back to the see-through mode 250 based on an input from the owner; and (d) automatically switch to the privacy mode when the light sensor provides the processor 228 with a nighttime signal.

In an embodiment, each of the electronic panels 210, 270 includes all of the elements, parts, components, configuration and functionality of the electronic panel 10 or any of the other electronic panels 92 or 96. The parts, components, and structural elements of each of the electronic panels 10, 92, 96, 210 and 270 can be combined into an integral or unitary assembly, or such parts, components, and structural elements can be distinct, removable items that are attachable to each other through screws, bolts, pins, adhesives, soldering, welding and other suitable fasteners.

Additional embodiments include any embodiment of the electronic panels 10, 92, 96, 210 and 270 described above, where one or more of its components, functionalities or structures is interchanged with, replaced by or augmented by one or more of the components, functionalities or structures of a different embodiment of the electronic panels 10, 92, 96, 210 and 270.

It should be understood that various changes and modifications to the embodiments described herein will be apparent to those skilled in the art. Such changes and modifica- The following is claimed:

1. An electronic panel comprising:
   a first display device comprising a first side configured to:
      face toward a first environment; and
      generate a first image that is viewable from the first environment;
   a second display device comprising a second side configured to:
      face toward a second environment; and
      generate a second image, other than the first image, that is viewable from the second environment;
   a multi-state device positioned between the first and second display devices, wherein the multi-state device is configured to be changed between a reflection state and a transmission state, wherein the multi-state device comprises an opaque characteristic in the reflection state, and the multi-state device comprises a transmission characteristic in the transmission state;
   at least one light source configured to generate a visible light;
   at least one processor operatively coupled to the first display device, the second display device, the multi-state device, and the at least one light source, wherein, under control of the at least one processor, the first and second display devices and the multi-state device are configured to cooperate in a plurality of modes comprising:
      a see-through mode when the multi-state device comprises the transmission state, wherein, in the see-through mode, the first and second display devices and the multi-state device are configured to enable:
         first environmental light from the first environment to pass through the first display device, through the multi-state device, through the second display device, and to the second environment; and
         second environmental light from the second environment to pass through the second display device, through the multi-state device, through the first display device, and to the first environment;
      a first display mode when the multi-state device comprises the reflection state, wherein, in the first display mode, the first display device is configured to display the first image, wherein the multi-state device at least partially reflects the visible light to facilitate visibility of the first image; and
      a second display mode when the multi-state device comprises the reflection state, wherein, in the second display mode, the second display device is configured to display the second image, wherein the multi-state device at least partially reflects the visible light to facilitate visibility of the second image.

2. The electronic panel of claim 1, wherein:
   the first display device comprises a first liquid crystal display device; and
   the second display device comprises a second liquid crystal display device.

3. The electronic panel of claim 1, wherein the multi-state device comprises:
   a plurality of polymer dispersed liquid crystals; and
   an electrical element operatively coupled to the at least one processor.

4. The electronic panel of claim 1, wherein, in the see-through mode, the first display device, the second display device, and the multi-state device are each configured to comprise a transmission portion, wherein the transmission portions are arranged to be intersected by a plurality of light paths originating from one of the first or second environments.

5. The electronic panel of claim 4, wherein, in the see-through mode, each of the transmission portions comprises one of a transparent portion or a semitransparent portion.

6. The electronic panel of claim 5, wherein, in each of the first and second display modes, the opaque characteristic interferes with the light paths.

7. The electronic panel of claim 1, wherein:
   the multi-state device comprises:
      a first layer side configured to face toward the first display device; and
      a second layer side configured to face toward the second display device;
   the at least one light source comprises a first light source, and the visible light comprises first visible light;
   the first light source is positioned to direct the first visible light toward the first layer side;
   the electronic panel comprises a second light source configured to generate second visible light; and
   the second light source is positioned to direct the second visible light toward the second layer side.

8. The electronic panel of claim 1, wherein:
   the multi-state device comprises a carrier portion;
   the carrier portion comprises:
      a first carrier side configured to face toward the first display device; and
      a second carrier side configured to face toward the second display device;
   the multi-state device comprises a first liquid crystal portion coupled to the first carrier side;
   the multi-state device comprises a second liquid crystal portion coupled to the second carrier side; and
   the multi-state device comprises an electrical element operatively coupled to:
      the first and second liquid crystal portions; and
      the at least one processor.

9. The electronic panel of claim 1, comprising a program storage device operatively coupled to the at least one processor, wherein:
   the program storage device comprises one of a memory device or an integrated circuit; and
   the program storage device stores a plurality of instructions that, when executed, cause the at least processor to control the modes.

10. The electronic panel of claim 9, comprising:
a support structure configured to support the first display device, the second display device, the multi-state device, the at least one light source, the at least one processor, and the program storage device, wherein the support structure defines one or more cavities; and
an electric power supplier operatively coupled to the at least one processor, wherein the at least one processor, the program storage device, and the electric power supplier are at least partially positioned within the one or more cavities.

11. An electronic panel comprising:
a first display device;
a second display device;
a multi-state device positioned between the first and second display devices, wherein the multi-state device is configured to be changed between a reflection state and a transmission state, wherein the multi-state device comprises an opaque characteristic in the reflection state, and the multi-state device comprises a transmission characteristic in the transmission state;
at least one light source configured to generate light;
at least one processor operatively coupled to the first display device, the second display device, the multi-state device, and the at least one light source, wherein, under control of the at least one processor, the first and second display devices and the multi-state device are configured to operate in a plurality of modes comprising:
a see-through mode in which an environmental light is passable from a first environment, through the first display device, through the multi-state device, through the second display device, and to a second environment;
a first display mode in which the first display device generates a first image, wherein the multi-state device at least partially reflects the light toward the first environment; and
a second display mode in which the second display device generates a second image other than the first image, wherein the multi-state device at least partially reflects the light toward the second environment.

12. The electronic panel of claim 11, wherein:
under control of the at least one processor in the first display mode, the first display device is configured and operable to generate a first image that is viewable from the first environment;
under control of the at least one processor in the second display mode, the second display device is configured and operable to generate a second image that is viewable from the second environment; and
under control of the at least one processor, the first and second display devices are configured and operable to cooperate with the multi-state device and the at least one light source in an environmental control mode in which the environmental light is one of partially blocked or fully blocked from passing between the first and second environments.

13. The electronic panel of claim 11, wherein:
the first display device comprises a first liquid crystal display device; and
the second display device comprises a second liquid crystal display device.

14. The electronic panel of claim 13, wherein the multi-state device comprises:
a plurality of polymer dispersed liquid crystals; and
an electrical element operable to manipulate the polymer dispersed liquid crystals.

15. The electronic panel of claim 14, wherein:
in the see-through mode, the first display device, the second display device, and the multi-state device each comprise a transmission portion, wherein the transmission portions are positioned to be intersected by a plurality of light paths originating from one of: (a) the first environment; (b) the second environment; or (c) a combination of the first and second environments; and
in each of the first and second display modes, the multi-state device comprises the opaque portion that interferes with the light paths.

16. The electronic panel of claim 15, wherein each of the transmission portions comprises one of a transparent portion or a semitransparent portion.

17. An electronic panel comprising:
a plurality of display devices;
at least one multi-state device that is at least partially positioned between the display devices, wherein the multi-state device is configured to be changed between a reflection state and a transmission state, wherein the multi-state device comprises an opaque characteristic in the reflection state, and the multi-state device comprises a transmission characteristic in the transmission state;
at least one light source configured to generate a visible light; and
one or more processors operatively coupled to the display devices, the at least one multi-state device, and the at least one light source, wherein, under control of the one or more processors, the display devices, the at least one multi-state device and the at least one light source are configured to operate in a plurality of modes comprising:
a see-through mode in which an environmental light is passable through one of the display devices, through the at least one multi-state device and through another one of the display devices;
a first display mode in which a first one of the display devices generates a first image viewable from a first environment, and the at least one multi-state device at least partially directs a first light toward the first environment; and
a second display mode in which a second one of the display devices generates a second image viewable from a second environment, and the at least one multi-state device at least partially directs a second light toward the second environment, wherein the second image differs from the first image.

18. The electronic panel of claim 17, wherein:
each of the display devices comprises a liquid crystal display device; and
the at least one multi-state device comprises:
a plurality of polymer dispersed liquid crystals; and
an electrical element operatively coupled to the one or more processors.

19. The electronic panel of claim 17, wherein:
under control of the one or more processors, the display devices and the at least one multi-state device are configured to simultaneously activate the first and second display modes in response to an input signal processed by the one or more processors; and
the first and second lights are generated by one of: (a) the at least one multi-state device that is configured to generate the first and second lights under control of the one or more processors; or (b) the at least one light source that is configured to generate the first and second lights under control of the one or more processors.

20. A window comprising the electronic panel of claim 17.

21. The electronic panel of claim 1, wherein:
the at least one processor is configured to process an input signal; and
the first and second display devices, the multi-state device, and the at least one light source, under control of the at least one processor, are configured to cooperate in response to the input signal to cause the first image to be viewable from the first environment while the second image is viewable from the second environment.

22. The electronic panel of claim 11, wherein, under control of the at least one processor, the first and second display devices and the multi-state device are configured to simultaneously activate the first and second display modes in response to an input signal processed by the at least one processor.

* * * * *